United States Patent
Feix et al.

(10) Patent No.: US 9,577,826 B2
(45) Date of Patent: Feb. 21, 2017

(54) METHOD OF GENERATING PROVEN PRIME NUMBERS SUITABLE FOR BEING IMPLEMENTED IN A SMART CARD

(71) Applicant: INSIDE SECURE, Meyreuil (FR)

(72) Inventors: Benoît Feix, Aubagne (FR); Christophe Clavier, Rilhac Lastours (FR); Pascal Paillier, Paris (FR); Loïc Thierry, Saint-Yrieix-la-Perche (FR)

(73) Assignee: Inside Secure, Meyreuil (FR)

( * ) Notice: Subject to any disclaimer, the term of this patent is extended or adjusted under 35 U.S.C. 154(b) by 213 days.

(21) Appl. No.: 14/365,671

(22) PCT Filed: Dec. 12, 2012

(86) PCT No.: PCT/FR2012/052901
§ 371 (c)(1),
(2) Date: Jun. 16, 2014

(87) PCT Pub. No.: WO2013/088065
PCT Pub. Date: Jun. 20, 2013

(65) Prior Publication Data
US 2014/0358980 A1   Dec. 4, 2014

(30) Foreign Application Priority Data

Dec. 15, 2011   (FR) .................................... 11 61739
Dec. 15, 2011   (FR) .................................... 11 61740
(Continued)

(51) Int. Cl.
*H04L 9/08*   (2006.01)
*G06F 7/58*   (2006.01)
(Continued)

(52) U.S. Cl.
CPC .............. *H04L 9/0869* (2013.01); *G06F 7/58* (2013.01); *G06F 7/72* (2013.01); *G06F 17/11* (2013.01);
(Continued)

(58) Field of Classification Search
CPC ........................... G06F 7/72; G06F 2207/7204
See application file for complete search history.

(56) References Cited

U.S. PATENT DOCUMENTS 6,134,325 A * 10/2000 Vanstone ................. H04L 9/302
                                                    380/30
6,330,332 B1 * 12/2001 Itoh .............................. G06F 7/72
                                                    380/1
(Continued)

*Primary Examiner* — Chuong D Ngo
(74) *Attorney, Agent, or Firm* — Brake Hughes Bellermann LLP

(57) ABSTRACT

The invention relates to a method for generating a prime number, implemented in an electronic device, the method including steps of generating a prime number from another prime number using the formula Pr=2P·R+1, where P is a prime number having a number of bits lower than that of the candidate prime number, and R is an integer, and applying the Pocklington primality test to the candidate prime number, the candidate prime number being proven if it passes the Pocklington test. According to the invention, the size in number of bits of the candidate prime number is equal to three times the size of the prime number, to within one unit, the generated candidate prime number being retained as candidate prime number only if the quotient of the integer division of the integer by the prime number is odd.

33 Claims, 9 Drawing Sheets

(30)  Foreign Application Priority Data

Dec. 15, 2011 (FR) ...................................... 11 61741
Dec. 15, 2011 (FR) ...................................... 11 61742
May 30, 2012 (FR) ...................................... 12 01550

(51) Int. Cl.
*G06F 7/72* (2006.01)
*G06F 17/11* (2006.01)

(52) U.S. Cl.
CPC .... *H04L 9/0816* (2013.01); *G06F 2207/7204* (2013.01); *H04L 2209/24* (2013.01)

(56) References Cited

U.S. PATENT DOCUMENTS

| 2002/0176573 | A1* | 11/2002 | Futa | ........................... | G06F 7/72 |
|  |  |  |  |  | 380/44 |
| 2007/0121934 | A1* | 5/2007 | Futa | ........................... | G06F 7/72 |
|  |  |  |  |  | 380/28 |
| 2011/0142231 | A1* | 6/2011 | Takeda | ...................... | G06F 7/72 |
|  |  |  |  |  | 380/30 |

\* cited by examiner

METHOD OF GENERATING PROVEN PRIME NUMBERS SUITABLE FOR BEING IMPLEMENTED IN A SMART CARD

The present invention relates to encryption and in particular to the generation of prime numbers. It also relates to integrated circuits such as those implemented in smart cards, and to the generation of prime numbers in such integrated circuits.

Thanks to Diffie and Hellman in particular, public key encryption has significantly developed. Today, it is used in various applications, such as payment, e-commerce, and identification applications as well as to cipher and sign data, and in numerous devices such as smart cards, USB drives and numerous microprocessors and computers. Most encryption systems like RSA (Rivest, Shamir, Adleman), DSA (Digital Signature Algorithm) and DH (Diffie Hellman key exchange) are based on the use of large prime numbers to generate encryption keys, or more generally secret data susceptible of being used in transactions requiring a certain level of security. The security of these encryption systems is therefore directly linked to the size of the prime is numbers used.

Due to the continuous evolution of technology and in particular the computing power of computers, encryption systems use increasingly large encryption keys and therefore increasingly large prime numbers. Thus, some banking organizations now recommend using 1,024-bit, or even 2,048-bit prime numbers in certain applications.

Usually, generating a prime number involves randomly choosing a number and verifying whether it is prime, for example by applying a primality test such as the sieve of Eratosthenes or the Fermat test. If the chosen number does not pass the primality test, a new number is then chosen. The choice of a new number varies from one method to another. It transpires that generating a prime number constitutes the most complex computation task to implement in encryption systems currently used today.

Until recently, it was inconceivable to perform this task of prime number generation in a smart card microcircuit due to the low computation power and storage abilities thereof. This task was therefore performed by a powerful computer, and the secret data generated from the prime number was securely transmitted to the microcircuit.

Current smart card microcircuits are generally provided with encryption coprocessors to accelerate certain operations like multiplications of large numbers and modular exponentiation operations, and have an increasingly large storage capacity. These improvements make it possible to consider generating large prime numbers directly in the smart card. This approach offers more security since there is no risk of the computer generating the secret data, or the transmission of the data to the smart card, being hacked. In addition, thanks to this approach, the entity issuing the smart card cannot know the secret data if it is generated in the card. This approach also enables the microcircuit to regenerate a prime number, as well as secret data based on this prime number, when necessary.

However, the computation and storage abilities of smart card microcircuits remain reduced compared with those of a desktop computer. In addition, in operational mode, the generation time of a key must remain below a limit acceptable for the user. There is therefore a need for a method of generating large prime numbers requiring small computation and storage means, complying with those implemented in smart cards.

Conventional methods of generating prime numbers are based on the use of probabilistic primality tests such as the Miller-Rabin and Lucas tests. However a probabilistic test does not by definition offer any absolute certainty that a generated number is prime and therefore does not allow proven prime numbers to be obtained. However, such certainty proves necessary when a high level of security is required, such as for payment and identification applications for example.

The trust level of such a test can be increased by executing several iterations of the test. Thus, generating a 1,024-bit prime number with a sufficient trust level requires 40 iterations of the Miller-Rabin test. This number of iterations may be reduced to 3 when the Miller-Rabin test is followed by the Lucas test. However, the Lucas test proves to be little compatible with the abilities of smart cards.

In addition, despite the significant improvements made to microcircuits integrated into smart cards, developing software adapted to such a microcircuit remains sensitive. Smart card microcircuits constitute an environment with multiple constraints compared with desktop computers or microprocessors in multimedia devices. Indeed, the capacity of the memories present in these microcircuits remains reduced. Some encryption operations implemented by encryption algorithms such as DES (Digital Encryption System), AES (Advanced Encryption System), RSA and ECC (Elliptic Curve Cryptography) need to be moved to a coprocessor to be performed efficiently enough. Thus, modular exponentiation operations constitute the most expensive operations in encryption systems such as RSA and DSA embedded in a smart card microcircuit. Such exponentiation operations are also required to generate prime numbers.

It is also necessary that the microcircuit remains protected against attacks aiming to discover the secret data stored or handled by the microcircuit. These last years, a great number of types of attacks have appeared, so developing a microcircuit protected against all the known types of attacks is a challenge for manufacturers of embedded security products.

Yet, it may be desirable to generate prime numbers by a deterministic method which by definition offers absolute certainty that the numbers obtained are prime, and which may be embedded into a smart card microcircuit.

For this purpose, there are iterative methods of generating large proven prime numbers from a relatively small proven prime number which may be lower than 32 bits. Thus, publications [3] and [4] describe such methods.

It may be desirable to reduce the execution time of such methods.

Some embodiments relate to an encryption method, implemented in an electronic device, the method comprising steps of generating a candidate prime number from another prime number using the following formula:

$$Pr = 2P \cdot R + 1,$$

where Pr is the candidate prime number, P is a prime number having a number of bits lower than a desired number of bits of the candidate prime number, and R is an integer, applying the Pocklington primality test to the candidate prime number, and supplying the candidate prime number as proven prime number if it passes the Pocklington test.

According to one embodiment, the size in number of bits of the candidate prime number is equal to three times the size of the prime number, to within one unit, the method comprising steps of calculating a quotient of an integer division of the integer by the prime number, and of rejecting the generated candidate prime number if the quotient of the integer division of the integer by the prime number is even.

According to one embodiment, if the candidate prime number is not retained as candidate prime number or if it does not pass the Pocklington test, the method comprises steps of incrementing the integer by one or a certain quantity as a function of the parity of the quotient so that the quotient is odd, modifying the candidate prime number by adding twice the prime number thereto, and applying the Pocklington primality test to the modified candidate prime number.

According to one embodiment, the method comprises a step of testing the divisibility of the candidate prime number by small prime numbers, the generated candidate prime number being retained as candidate prime number only if it is not divisible by the small prime numbers.

According to one embodiment, the method comprises several steps of generating a new prime number, a first generation step supplying a prime number from a first prime number, each subsequent generation step supplying a prime number from the prime number obtained in the previous generation step, until a prime number formed of a desired number of bits is obtained, each generation step comprising the steps of generating a candidate prime number and of applying the Pocklington test to the candidate prime number.

According to one embodiment, the method comprises steps of storing as first remainders, the remainders of the integer divisions of the candidate prime number by each of the small prime numbers, the candidate prime number being divisible by one of the small prime numbers if the corresponding remainder is equal to zero, storing as second remainders, the remainders of the integer divisions of twice the prime number by each of the small prime numbers, and if a new candidate prime number is calculated from the candidate prime number by adding twice the prime number thereto, updating each of the first remainders by respectively adding thereto the second remainder corresponding to the same small prime number.

According to one embodiment, each subsequent step of generating a prime number comprises steps of randomly choosing a new integer, and updating each of the second remainders with the double of the first remainder corresponding to the same small prime number, obtained in the previous generation step.

According to one embodiment, the integer is randomly chosen in the interval [I+1, 2I] with:

$$I = \left\lfloor \frac{2^{L-1}}{2P} \right\rfloor$$

L being the desired number of bits of the new prime number to be generated.

According to one embodiment, the method comprises steps of generating the integer from an invertible number belonging to a set of invertible elements modulo a product of numbers belonging to a group of small prime numbers greater than 2, so that the candidate prime number is not divisible by any number of the group, the prime number having a number of bits equal to within one bit to a third of the desired number of bits of the candidate prime number.

According to one embodiment, the integer is chosen equal to:

$$R = X - ((2P)^{-1} \bmod \Pi v) + Z \cdot \Pi v,$$

X being an invertible number modulo the product of the prime numbers of the group, P being the prime number, and Z being an integer chosen so that the number R has a size such that the candidate prime number has the desired number of bits.

According to one embodiment, the integer is chosen so as to be even and so that the remainder of its integer division by the prime number is odd.

According to one embodiment, the integer is chosen equal to:

$$R = K + (K \bmod 2) P \cdot \Pi v + 2 P \cdot Z \cdot \Pi v,$$

where $K = (((X - (2P)^{-1} - S)/P) \bmod \Pi v) P + S$, S being the remainder of the integer division of the integer R by the prime number P, X being an invertible number modulo the product $\Pi v$ of the prime numbers of the group, P being the prime number, and Z being an integer chosen so that the number R has a size such that the candidate prime number has the desired number of bits.

According to one embodiment, if the candidate prime number does not pass the Pocklington primality test, the method comprises steps of generating a new candidate prime number by adding to the candidate prime number a multiple of the invertible number modulo the product, the multiple not being divisible by one of the numbers forming the product, and applying the Pocklington primality test to the new candidate prime number.

According to one embodiment, the invertible number is generated by searching for an invertible candidate number X lower than the product $\Pi v$ verifying the following equation:

$$X^{\lambda \Pi v} = 1 \bmod \Pi v,$$

$\lambda \Pi v$ being the Carmichael number of the set of invertible elements modulo the product FN.

According to one embodiment, an invertible candidate number is randomly chosen at a value lower than the product $\Pi v$ and incremented by one or the quantity $B \cdot (1 - X^{\lambda \Pi v} \bmod \Pi v)$ until it verifies the equation:

$$X^{\lambda \Pi v} = 1 \bmod \Pi v,$$

B being the integer randomly chosen between one and the product $\Pi v$.

According to one embodiment, the generation of the first prime number comprises steps of: randomly choosing a number formed of the reduced number of bits and applying to the chosen number a limited set of Miller-Rabin primality tests in different bases, until the chosen number passes the set of Miller-Rabin tests, the maximum number of bits and the values of the bases being chosen to prove the primality of the first prime number.

According to one embodiment, the Miller-Rabin tests applied to the randomly chosen number are performed in bases 2, 7 and 61 with a maximum number of bits chosen lower than or equal to 32, or in bases 2, 3, 5, 7, 11, 13 and 17, with a maximum number of bits chosen lower than or equal to 48.

According to one embodiment, the method comprises steps of: generating an encryption key from the proven prime number supplied.

Some embodiments also relate to an electronic device comprising a calculation block to execute multiplications of large numbers and/or modular exponentiation operations, the electronic device being configured to implement the method of generating prime numbers as previously defined.

Some embodiments also relate to an integrated circuit on semiconductor chip, comprising a device as previously defined.

Some examples of embodiments of the present invention will be described below in relation with, but not limited to, the appended figures, in which.

Figure 21:
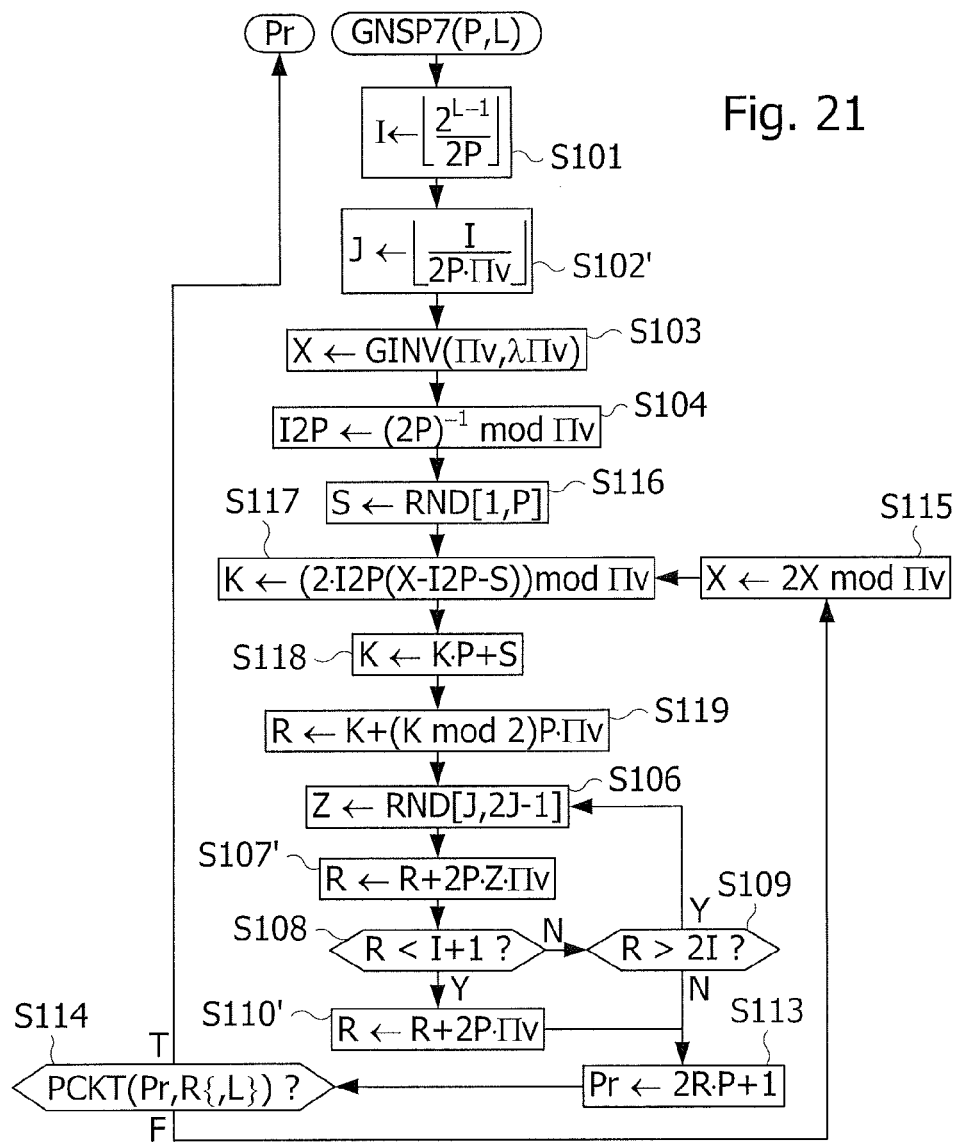
FIG. 21 represents a sequence of steps configured to generate a prime number from a prime number of lower size, according to another embodiment.
Figure 22:
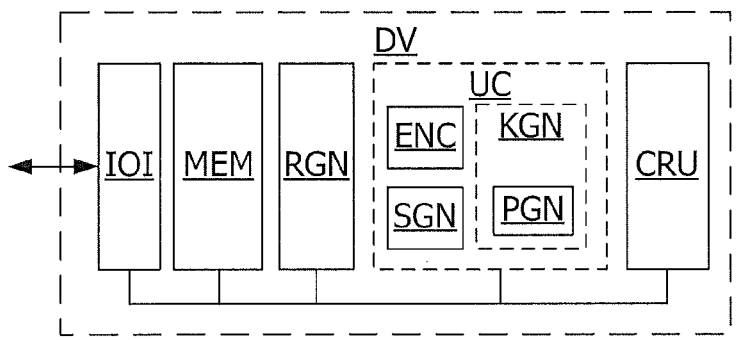
Figure 23:
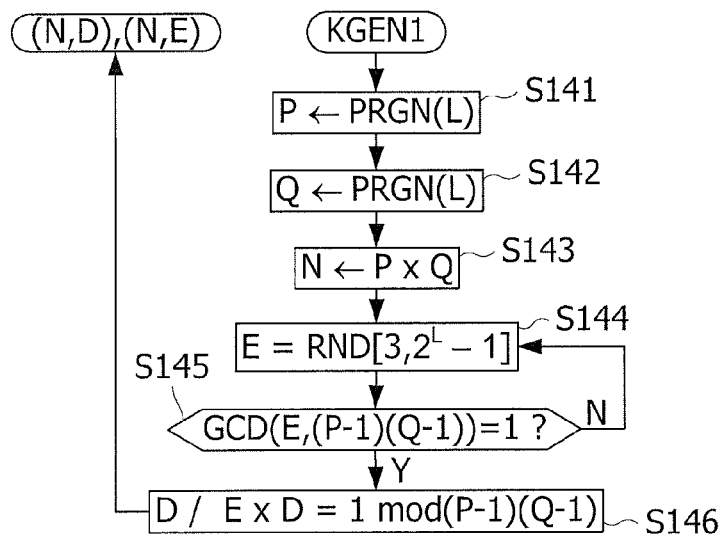
Figure 24:
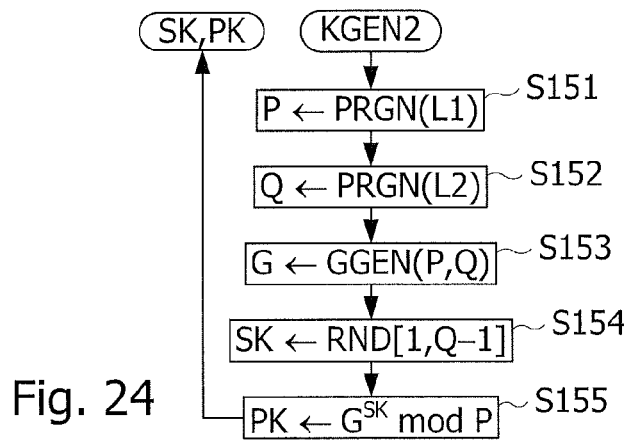

FIG. 22 schematically represents an example of an electronic device which may implement the various sequences of steps shown in FIGS. 1 to 21;

FIGS. 23 and 24 represent sequences of steps of generating encryption keys, using prime numbers.

According to one embodiment, it is provided to generate a prime number of a certain size in number of bits relying on a theorem derived from the theorem proven by Brillhart, Lehmer and Selfridge (cf. publication[6]). The derived theorem is formulated as follows:

Let P be a prime number greater than 2 and R an integer lower than $P^2+1$. The number N such that:

$$N=2R \cdot P+1 \quad (1)$$

is prime, (i) if there is an integer A greater than or equal to 2 and lower than or equal to N such that:

$$A^{N-1}=1 \bmod N, \text{ and} \quad (2)$$

$$GCD(A^{2R}-1,N)=1, \quad (3)$$

(ii) the quotient of the integer division of R by P, $$\left\lfloor \frac{R}{P} \right\rfloor,$$

is odd, mod being the modulo operation and GCD(x,y) being a function providing the greatest common divisor of numbers x and y.

This theorem enables a prime number to be obtained from a prime number of lower size. This theorem may therefore be applied in several iterations, from a small prime number obtained by another method, then from the prime number obtained during the previous iteration, until a prime number of the desired size is obtained. Given the relationship between the numbers N and P, simply choosing the size of the number R may enable a new prime number having a size substantially equal to triple the size of the prime number P to be obtained. It shall be noted that the primality of the numbers obtained by applying this theorem is proven, as opposed to the probabilistic characteristic of prime numbers obtained by certain known methods, for example relying on Fermat or Miller-Rabin tests.

Figure 1:
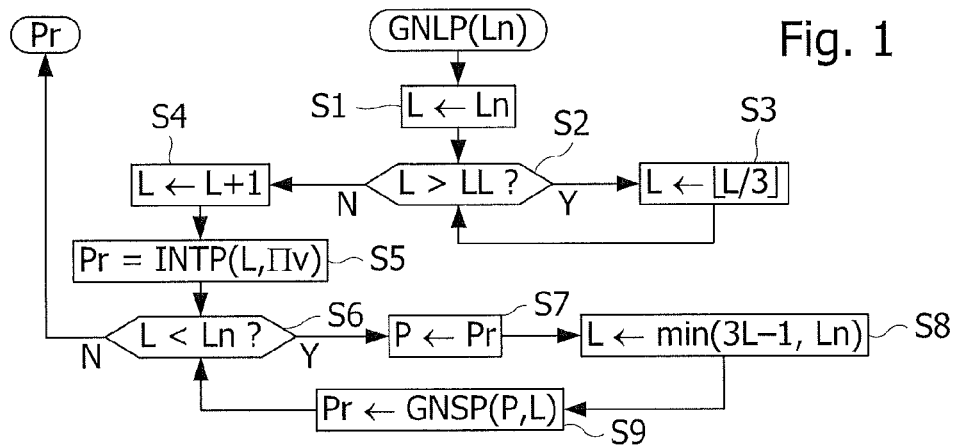
FIG. 1 represents a sequence of steps configured to generate a large prime number, according to one embodiment.

Thus, FIG. 1 represents steps S1 to S9 of a procedure GNLP for generating a large prime number. The procedure GNLP receives as input parameter the size Ln in number of bits of the prime number to be generated. Steps S1 to S4 make it possible to determine the size L (in number of bits) of a first prime number to be generated from the size Ln of the prime number to be generated.

In step S1, the size Ln received as parameter is loaded into a local variable L. In step S2, the variable L received at input of the procedure is compared with a maximum value LL of the first prime number, for example equal to 32 or 48 bits. In steps S2 and S3, as long as the variable L is greater than the maximum size LL, the value of the variable L is divided by 2 (receives the quotient of the integer division of L by 3). When the variable L is lower than the maximum size LL, the size L is incremented by one in step S4.

It shall be noted that if the memory of the circuit intended to execute the procedure GNLP makes it possible, steps S2 to S4 may be replaced by the reading of a table indexed by size Ln of prime number to be generated and giving the size L0 of the first number to be generated. Indeed, the size Ln is generally limited to a reduced number of possible values, in particular powers of 2. An example of this table when the maximum value LL is equal to 32, is given by the following Table 1:

TABLE 1

| Ln | 512 | 768 | 1,024 | 2,048 |
|---|---|---|---|---|
| L0 | 20 | 29 | 14 | 26 |
| k | 3 | 3 | 4 | 4 |

In step S5 following step S4, a procedure INTP for determining a first prime number having the size L is called. The procedure receives as input parameter the variable L and the product Πv of v smallest prime numbers, and supplies a prime number Pr. The v smallest prime numbers in the product Πv are for example those lower than 100 or 200 (v is between 25 and 46), the number 2 possibly being excluded. In step S6, the variable L is compared with the size Ln of the prime number to be generated. This step marks the input of a process loop in which steps S7 to S9 are executed at each iteration of the process loop, until the size Ln of the prime number to be generated is reached. In step S6, if the variable L is lower than the size Ln, steps S7 to S9 are executed, otherwise the procedure GNLP ends by supplying the last number Pr obtained.

In step S7, a variable P receives the last prime number Pr obtained. In step S8, the value of the variable L is tripled (=3L−1), to within one unit, without exceeding the size Ln of the prime number to be generated. Calculating the size L of the following prime number to be generated, performed in step S8, enables the condition R<P²+1 of the previously mentioned theorem to be achieved. In step S9, a procedure GNSP is called, with the variables P and L as input parameters. The procedure GNSP supplies a prime number Pr having the size L from the prime number P of lower size supplied at input. For this purpose, the procedure GNSP relies on the previously mentioned derived theorem. It shall be noted that the values of k supplied in Table 1 represent the number of iterations performed by the procedure GNLP. The condition R<P²+1 of the previously mentioned derived theorem is substantially satisfied by the operation executed in step S8 to determine the size of the following prime number to be generated.

According to one embodiment, the procedure INTP may implement the sieve of Eratosthenes, i.e. randomly choosing a candidate prime number having a small size for example between 16 and 24 bits, and testing the divisibility of the candidate prime number by all the prime numbers lower than the square root of the candidate prime number.

According to another embodiment, the first prime number Pr obtained in step S5 may be set to a certain value.

According to another embodiment, the procedure INTP may involve randomly choosing a prime number in a pre-established list of prime numbers having the same size set to a value lower than 33 or 49 bits.

According to another embodiment, the first small prime number supplied by the procedure INTP in step S5 is obtained by randomly choosing a number whose size is lower than 32 bits, and by applying the Miller-Rabin probabilistic test, successively in bases 2, 7 and 61. Indeed, Pomerance et al. (cf. publication[1]) and Jaeschke (cf. publication[2]) have shown that any integer having a size lower than 32 bits is a proven prime number, if it passes the Miller-Rabin test in bases 2, 7 and 61. The parameter LL in the procedures GNLP, GNLP1, GNM and GNST is then set to 32 and represents the maximum size in number of bits that the prime number generated by the procedure INTP may have.

The Miller-Rabin test involves splitting up a candidate prime number N to be tested, decreased by 1, as follows:

$$N-1=2^S \times D, \quad (4)$$

S being an integer, D being an odd number, and by checking that for a number A called "base", lower than N and prime with N, one of the following equations is satisfied:

$$A^D=1 \bmod N, \quad (5)$$

$$A^{2^R D}=-1 \bmod N, \quad (6)$$

R being an integer between 0 and S−1. Thus, according to the Miller-Rabin test, the number N is probably prime if one or the other of the equations (4) and (5) is satisfied. The first prime number is therefore obtained by applying the Miller-Rabin test three times, with the number A successively chosen equal to 2, 7 and 61, and discarding the candidate numbers N not verifying the test in bases 2, 7 or 61.

According to another embodiment, applying the Miller-Rabin tests in bases 2, 7 and 16 is preceded by a step of testing the divisibility of the candidate prime number by the v smallest prime numbers, where v is for example between 20 and 50. In other words, a candidate number N is discarded if it is divisible by one of the v smallest prime numbers.

According to another embodiment, applying the Miller-Rabin test in bases 2, 7 and 16 is preceded by a step of applying the Fermat probabilistic test in base 2. According to the Fermat test, the number N is probably prime if the following condition is satisfied:

$$A^{N-1}=1 \bmod N, \quad (7)$$

where A is an integer representing the base (chosen equal to 2).

Figure 2:
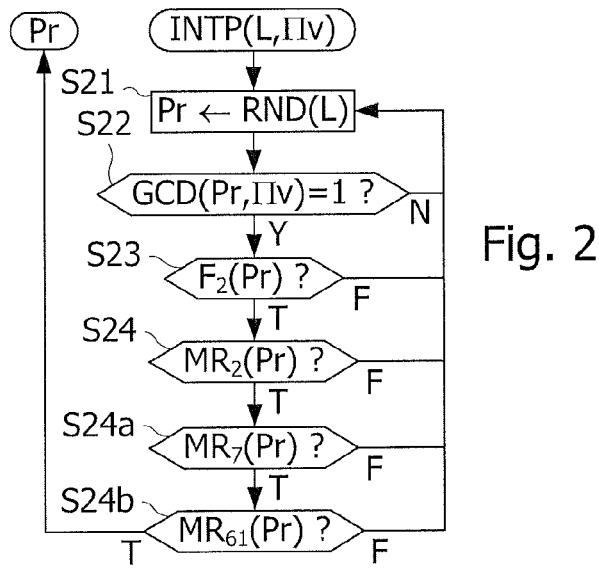
FIG. 2 represents a sequence of steps configured to generate a small prime number, according to one embodiment.

According to one embodiment, the first small prime number is obtained by executing a sequence of steps such as that represented in FIG. 2. FIG. 2 represents a procedure INTP receiving as input parameters the size L of the prime number to be generated and the product Πv of the v smallest prime numbers, and supplying a prime number Pr of size L, where L is lower than 32. The procedure INTP comprises steps S21 to S24b. In step S21, a number Pr of size L is randomly chosen by means of a random or pseudo-random function RND. Steps S22 to S24b are primality tests successively applied to the number Pr.

In step S22, it is sought whether the number Pr is divisible by one of the v prime numbers of the product Πv and the test fails if the number Pr is divisible by one of the v numbers of the product Πv. This test may be performed by seeking the greatest common divisor GCD of the number Pr and the product Πv, the number Pr not being divisible by any of the v smallest prime numbers if the greatest common divisor thus calculated is equal to 1. The product Πv may not comprise the number 2 if the number Pr is chosen odd in step S21. Instead of receiving the product Πv, the procedure may receive the v first prime numbers in the form of a list Q, and step 22 may involve successively testing the divisibility of the number Pr by each of the prime numbers of a list Q containing the v prime numbers of the product Πv.

According to another embodiment, the divisibility test of the number Pr by one of these prime numbers may involve calculating the greatest common divisor of the numbers Pr and Πv. In step S23, the Fermat test in base 2 is applied to the number Pr. In steps S24, S24a and S24b, the Miller-Rabin tests in bases 2, 7 and 61 are respectively and successively applied to the number Pr.

If one of the tests fails, step S21 is executed again to choose another number Pr. If one of the tests is successfully executed in one of steps S22 to S24a, the next step S23 to S24b is executed. If the last primality test executed in step S24b is successfully executed, the procedure INTP ends by supplying the number Pr whose primality is thus proven.

Figure 3:
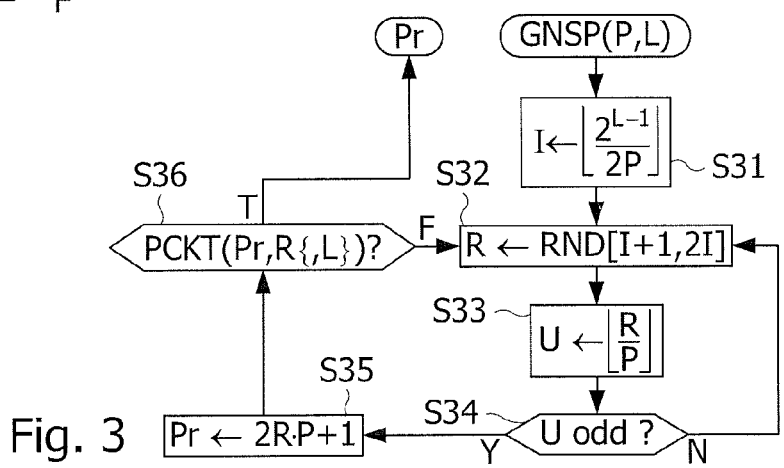
FIG. 3 represents a sequence of steps configured to generate a prime number from a prime number of lower size, according to one embodiment.

FIG. 3 represents steps S31 to S36 of the procedure GNSP, according to one embodiment. Steps S31 to S36 are successively executed. In step S31, a number I is calculated using the following formula:

$$I = \left\lfloor \frac{2^{L-1}}{2P} \right\rfloor \quad (8)$$

P being a prime number, L being the size of a new prime number to be generated, P and L being received as input parameters of the procedure GNSP, and $$\left\lfloor \frac{x}{y} \right\rfloor$$

representing the quotient of the integer division of x by y. In step S32, an integer R is chosen by means of a random or pseudo-random function RND in the interval [I+1, 2I]. The next steps S33 and S34 are provided to implement the test (ii) of the previously mentioned theorem, given that the test (i) is implemented by step S36. In step S33, the quotient U of the integer division of the number R by the number P is calculated. In step S34, if the quotient U is even, the execution of the procedure continues at step S33 to determine a new integer R. If the quotient U is odd, step S35 is executed to determine a candidate prime number Pr using the formula (1). In step S36, the primality of the candidate prime number Pr is tested by means of the test (i) corresponding to the Pocklington test. This test is implemented by a procedure PCKT. This procedure receives as input parameters the number Pr to be tested and the number R used to calculate the number Pr in step S35, as well as optionally the size L in number of bits of the number Pr. This procedure sends back a Boolean variable set to "True" if the number Pr passes the test, and to "False" otherwise. If the procedure PCKT returns "True", the number Pr is prime, and the procedure GNSP ends by supplying the number Pr. If the procedure PCKT returns "False", the execution of the procedure GNSP continues at step S33 to determine a new integer R.

Figure 4:
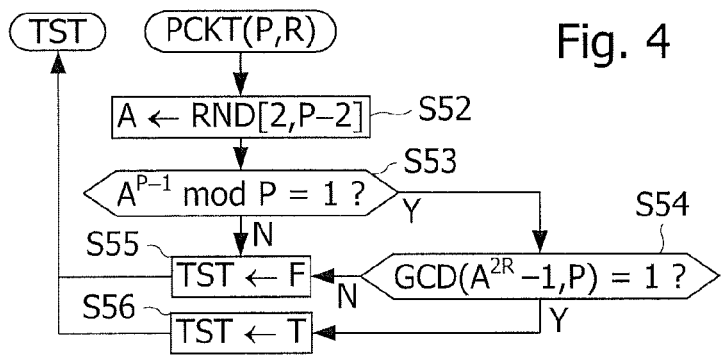
FIGS. 4 and 5 represent sequences of steps implementing a deterministic primality test, according to some embodiments.

FIG. 4 represents steps S52 to S56 of the procedure PCKT, according to one embodiment. This procedure successively applies to the numbers P and R received at input by the procedure PCKT the tests corresponding to the equations (2) and (3). If the numbers P and R pass both tests, the procedure PCKT returns "True", otherwise "False". In step S52, an integer A is chosen by means of a random or pseudo-random function RND in the interval [2, P-2]. In step S53, if the number P verifies the equation (2), step S54 is executed, otherwise step S55 is executed. In step S54, if the numbers P and R verify the equation (3), step S46 is executed, otherwise step S55 is executed. In step S55, a Boolean variable TST is set to "False". In step S56, the variable TST is set to "True". The procedure PCKT ends after step S55 or S56 by returning the variable TST.

It shall be noted that the equation (3) tested in step S54 may be implemented by first calculating the quantity $B=A^{2R}-1$ mod P, then by calculating GCD (B, P).

Figure 5:
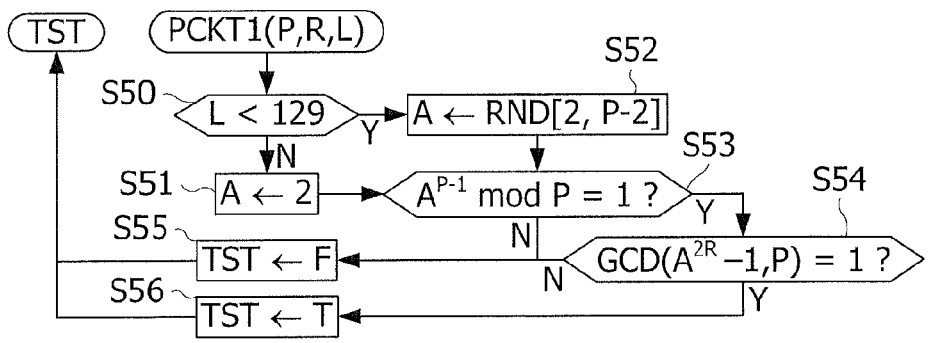
Figure 7:
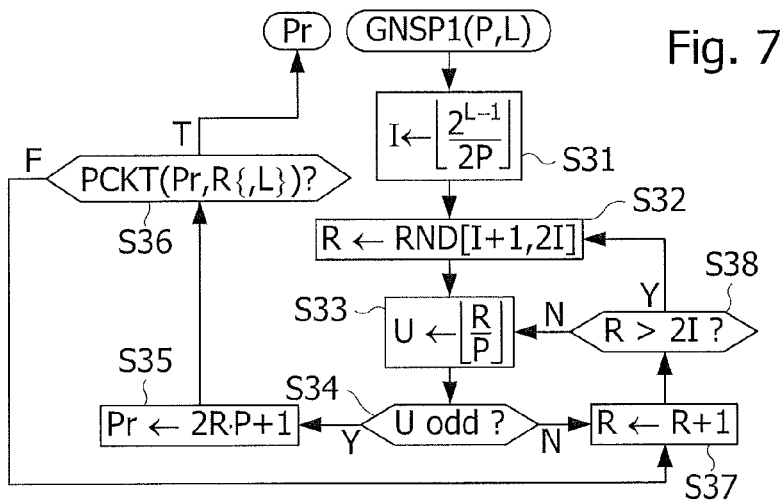
FIGS. 7 and 8 represent sequences of steps configured to generate a prime number from a prime number of lower size.

FIG. 5 represents another embodiment PCKT1 of the procedure PCKT of FIG. 7. The procedure PCKT1 differs from the procedure PCKT in that it comprises additional steps S50 and S51 of forcing the number A to 2 (step S51) if the size L of the number P received as input parameter of the procedure is greater than or equal to a certain value, for example equal to 129 (step S50). Forcing the number A to 2 enables modular exponentiation operations to be more rapidly performed in steps S53 and S54 when the numbers P and R are large. Indeed, when the number A is set to 2, numbers in the form $2^n$ must be calculated, which may be performed by a microcircuit, by square and modular addition calculations. If it is assumed that the proportion of prime numbers rejected by setting the value of the number A does not change as a function of this value, setting the value of A to a constant value such as 2 has an insignificant impact on the distribution of the prime numbers generated when the size of the number P to be tested is large enough (for example greater than 128 bits). Indeed, it has been proven that the probability that the choice of a certain value of A causes the rejection of a prime number in step S53 is equal to 1/P. Consequently, the larger the number P, the lower this probability. From L=128, which corresponds to a number P of 64 bits, this probability becomes insignificant.

Figure 6:
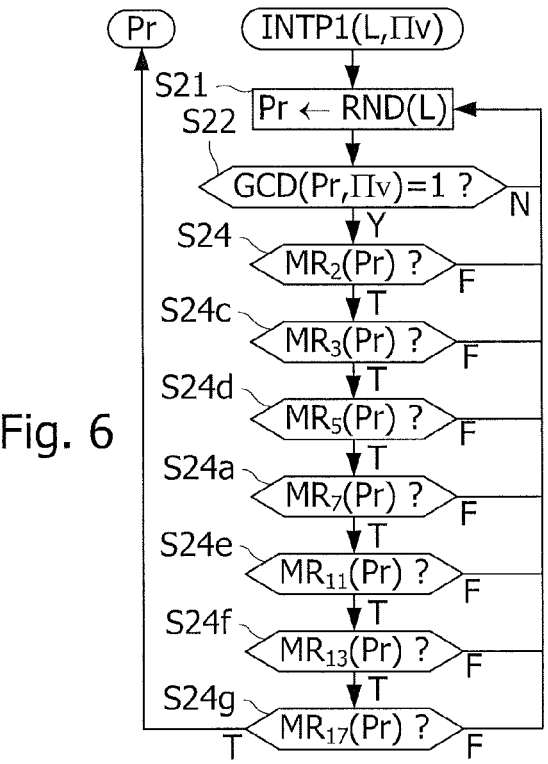
FIG. 6 represents a sequence of steps configured to generate a small prime number, according to one embodiment.

FIG. 6 represents a procedure INTP1 for generating a first small prime number, according to another embodiment. This procedure is based on the fact that a number of less than 48 bits which passed the Miller-Rabin tests in bases 2, 3, 5, 7, 11, 13 and 17, is a proven prime number. The procedure INTP1 differs from the procedure INTP in that the Miller-Rabin primality tests in bases 7 and 61 are replaced with Miller-Rabin tests in bases 3, 5, 7, 11, 13 and 17, and in that the prime number obtained may have a size which may reach 48 bits. The maximum size LL in the procedures GNLP, GNLP1, GNM and GNST may then be set to 48. Thus, the procedure INTP1 comprises steps S21, S22 and S24 of the procedure INTP (FIG. 2). Then, the procedure INTP1 comprises steps S24c to S24h of applying the Miller-Rabin test in bases 3, 5, 7, 11, 13 and 17. If the candidate prime number Pr chosen in step S21 passes one of the tests executed in one of steps S22, S24, S24c to S24g, the next step S24, S24c to S24h is executed. If the prime number Pr fails one of these tests, a new candidate prime number Pr is chosen in step S21. If the candidate prime number Pr verifies all the tests and in particular the Miller-Rabin test in base 17 executed in step S24g, the procedure INTP1 ends by supplying the number Pr as proven prime number.

As the procedure INTP1 may supply a prime number near 48 bits instead of a prime number near 32 bits for the procedure INTP, this procedure may reduce the number of iterations of the procedure GNLP.

It shall be noted that step S22 in the procedures INTP and INTP1 is provided to more easily discard candidate prime numbers (by means of less expensive operations in terms of resources and computation time) than a Fermat or Miller-Rabin test. Step S22 may therefore be omitted without affecting the proven characteristic of the number Pr supplied by the procedure INTP, INTP1. The Fermat test executed in step S23 of the procedure INTP is also provided to more easily discard candidate prime numbers than the Fermat test. This step may also be removed if the calculation means used to implement this procedure can efficiently execute the Miller-Rabin tests (within a time acceptable for the user).

Choosing the value of the number v of the smallest prime numbers used in step S22 may be performed as a function of the global execution duration of the procedure INTP or INTP1, given that the more the value v is increased, the more the execution duration of step S22 increases, and the more the global execution duration of the tests performed in steps S23 to S24b or S24 to S24h decreases.

FIG. 7 shows another embodiment GNSP1 of the procedure GNSP of FIG. 3. The procedure GNSP1 differs from the procedure GNSP in that it comprises two additional steps S37 and S38. Steps S37 and S38 are executed instead of step S32, if the quotient U is even or if the procedure PCKT called in step S36 returns "False". In step S37, the number R is incremented by 1. In step S38, the number R is compared with the quantity 2I, so that R remains within the interval [I+1,2I]. If the number R is greater than the quantity 2I, the execution of the procedure continues at step S32 to randomly choose a new number R in the interval [I+1, 2I], to calculate a new candidate prime number Pr and to test it. If in step S38, the number R is lower than or equal to the quantity 2I, the execution of the procedure continues at step S33. Thus, steps S33 to S36 form a first process loop in which the number R varies from the value allocated thereto in step S33 up to the value 2I, if any, and in which the primality of the number Pr corresponding to the number R is tested. Steps S32 to S36 form a second process loop enabling the first loop to be executed with a new value of R randomly chosen in the interval [1+1,2I].

In this way, if the Pocklington tests executed in step S36 fail, the multiplication of large numbers performed in step S35 is avoided as long as the integer R is lower than the quantity 2I.

Figure 8:
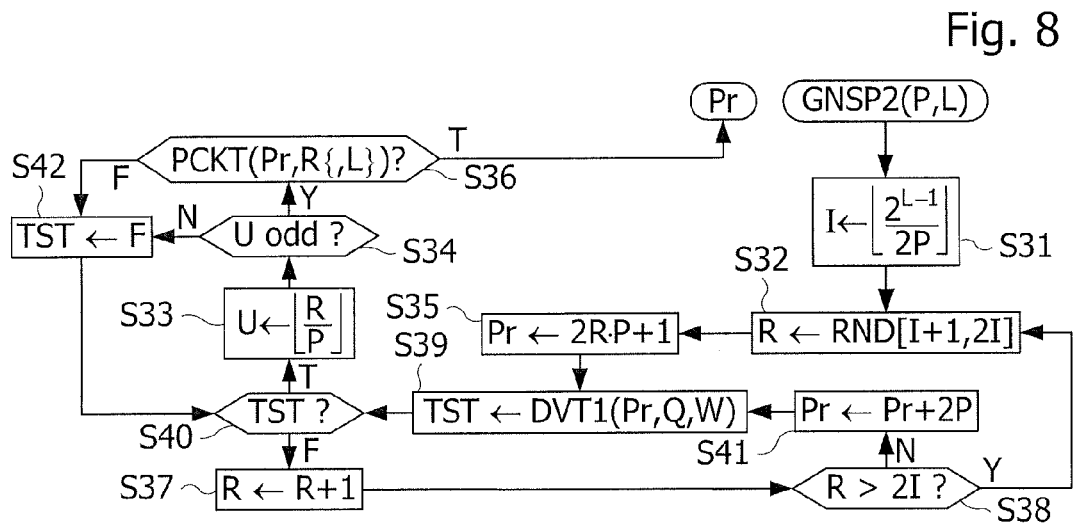

FIG. 8 represents another embodiment GNSP2 of the procedure GNSP of FIG. 3. The procedure GNSP2 differs from the procedure GNSP in that it comprises additional steps S39 to S42. Steps S39 and S40 are executed after step S35. In step S39, a procedure DVT1 for testing the divisibility of the number Pr by the v prime numbers of the list Q is called. The procedure DVT1 receives as input parameters the number Pr, the list Q, and a table W, and supplies a Boolean variable TST set to "True" if the number Pr is not divisible by the numbers of the list Πv and otherwise set to "False". In step S40, the variable TST is tested. If the variable TST is "True", step S33 is executed, otherwise step S37 is executed. If in step S38, the number R is lower than the quantity 2I, steps S41, S39 and S40 are successively executed. In step S41, the number Pr is updated taking into account the incrementation of the number R in step S37. Thus, in step S40, the number Pr is simply incremented by twice the prime number P. This calculation results from the incrementation of the number R performed in step S37 and the formula (1). In this way, the number Pr may simply be updated by a binary shift of P followed by an addition, instead of implementing a multiplication of large integers as in the formula (1) implemented in step S35. After step S41, the execution of the procedure GNSP2 continues at step S39.

Thus, steps S33, S34 and S36 to S42 form a first process loop in which the number R is incremented by one at each iteration, up to the quantity 2I, if any, and in which the primality of the number Pr corresponding to the number R is tested. Steps S32 to S42 form a second process loop enabling the first loop to be executed with a new value of R randomly chosen in the interval [1+1,2I]. As long as the number Pr obtained in step S35 or S41 does not satisfy the non-divisibility and Pocklington tests, a new candidate prime number is determined in steps S32 and S35 or S41.

Figure 9:
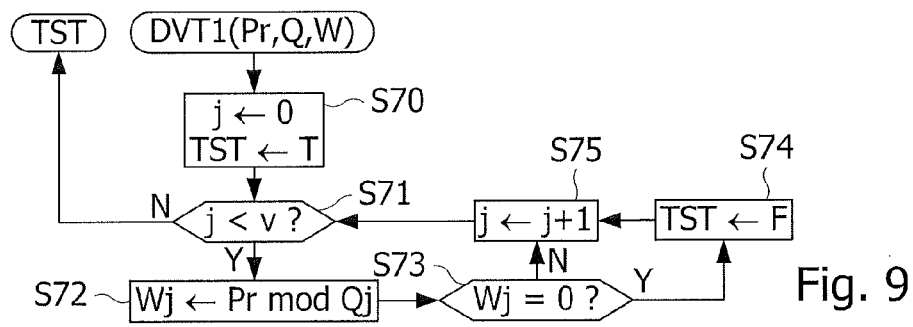
FIG. 9 represents a sequence of steps configured to test the divisibility of a number by a list of prime numbers.

FIG. 9 represents steps S70 to S75 of the procedure DVT1, according to one embodiment. In step S70, a loop index j is set to 0 and a Boolean variable TST is set to "True". Step S71 which forms the input of a loop comprising steps S72 to S75, compares the index j to the number v of small prime numbers in the list Q. This loop enables the divisibility of the number Pr by each number Qj of the list Q, to be tested. If the index j is lower than the number v in step S71, a loop iteration beginning at step S72 is executed, otherwise, the procedure DVT1 ends by supplying the variable TST. In step S72, a variable Wj, stored in a location of index j in the table W, receives the remainder of the integer division of the number Pr by the number Qj. The variable Wj may thus be calculated using the following formula:

$$Wj=Pr \bmod Qj \quad (9)$$

In step S73, the variable Wj is compared with 0. If the variable Wj is equal to 0, meaning the candidate number Pr is divisible by the number Qj, steps S74 and S75 are executed, otherwise only step S75 is executed. In step S74, the variable TST is set to "False", to indicate that the number Pr is not a prime number. In step S75, the index j is incremented by one. Step S71 is executed after step S75 either to execute a new iteration, or to supply the variable TST at the end of the execution of the procedure DVT1. It shall be noted that for the procedure GNSP2, the remainders Wj do not have to be stored in a table. The remainder obtained in step S72 can therefore simply be loaded into a register to be able to be compared to 0 in step S73.

Figure 10:
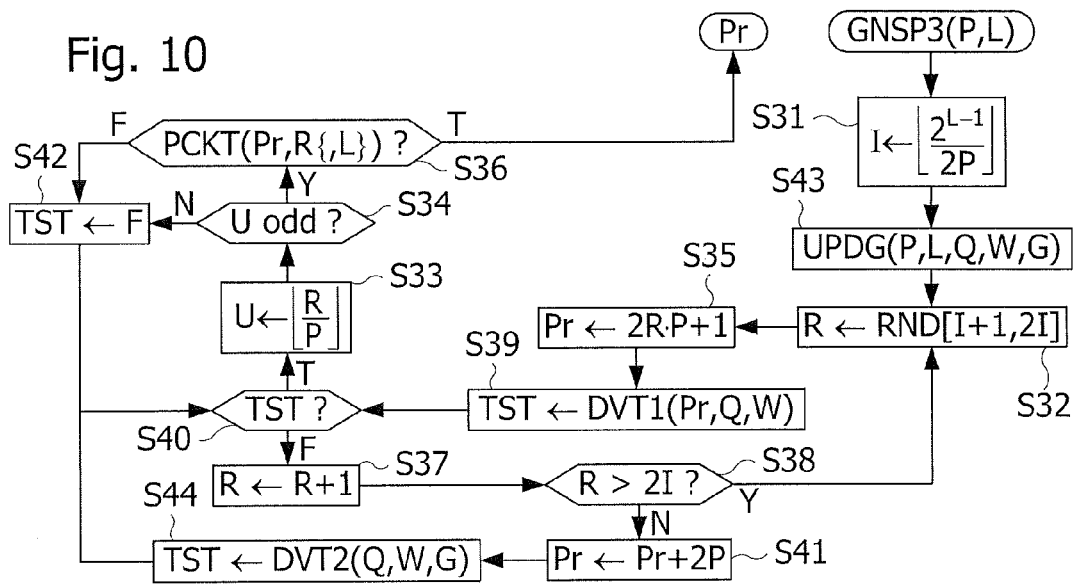
FIG. 10 represents a sequence of steps configured to generate a prime number from a prime number of lower size, according to one embodiment.

FIG. 10 represents another embodiment GNSP3 of the procedure GNSP. The procedure GNSP3 differs from the procedure GNSP2 in that it comprises calculation optimizations in the divisibility tests of the number Pr by the prime numbers of the list Q. Thus, the procedure GNSP3 comprises an additional step S43 executed between steps S31 and S32, and an additional step S44 executed between steps S41 and S40.

In step S43, a procedure UPDG is called with as input parameters, the prime number P, the size L of the number Pr (in number of bits), the list Q, the table W, and a table of values G. The table G is provided to receive the remainders Gj of the divisions of twice the number P by each number Qj. The number of values in each table W, G corresponds to the number v of prime numbers in the list Q. The procedure UPDG is provided to update the table G. In step S43, a procedure DVT2 is called with as input parameters the number Pr, the list Q, and the tables of values W and G. The procedure DVT2 enables the table W to be updated only by operations involving small numbers, and the divisibility of the candidate prime number Pr updated in step S41 to be tested.

Figure 11:
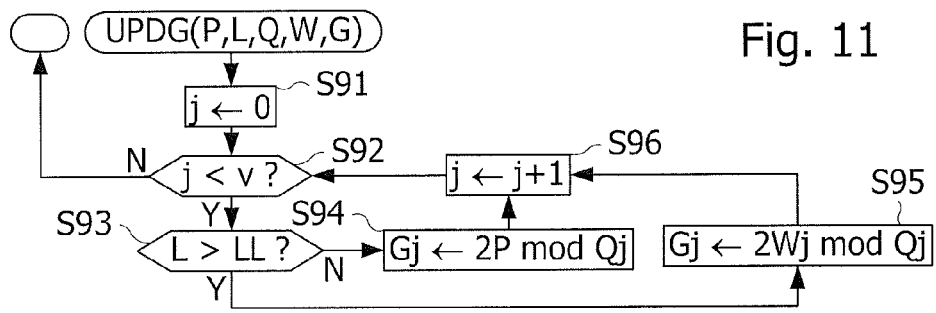
FIGS. 11 and 12 represent sequences of steps configured to test the divisibility of a number by a list of prime numbers.

FIG. 11 represents steps S91 to S96 of the procedure UPDG. In step S91, a loop index j is set to 0. Step S92, which forms the input point of a loop comprising steps S93 to S96, compares the index j with the number v of prime numbers in the list Q. This loop allows the table G to be updated. If the index j is lower than the number v in step S92, a loop iteration beginning at step S93 is executed, otherwise, the execution of the procedure UPDG is ended. In step S93, it is determined whether the procedure (GNSP2) having called the procedure UPDG is called for the first time by the procedure GNLP, in other words, whether the number P received as calling parameter of the procedure GNSP2 has been determined for example by the procedure INTP. This condition may be determined from the size L of the prime number P, supplied as calling parameter of the procedure GNSP2, given the calculation of the size of the first prime number compared with the maximum size LL, performed by the procedure GNLP (steps S2 to S4). If the size L corresponds to that of the first prime number supplied by the procedure INTP, steps S94 and S96 are executed, otherwise steps S95 and S96 are executed. In step S94, the value Gj is calculated using the following formula:

$$Gj=2P \bmod Qj \quad (10)$$

Qj being a prime number of rank j in the list Q. In step S95, the value Gj is calculated using the following formula:

$$Gj=2Wj \bmod Qj \quad (11)$$

Wj being a value previously obtained in step S72, or in another step S84 described below, during a previous call of the procedure GNSP2. The tables W and Q containing the values Wj and Gj which are successively loaded in steps S72 and S94 or S95, are therefore stored in so-called "global" variables which are not erased at each call of the procedure GNSP2. The implementation of the formula (13) is also a calculation simplification compared with the formula (10) executed in step S94. Indeed, the formula (13) involves dividing small numbers, while the formula (10) involves dividing a large number (2P) by a small number Qj. In step S96, the index j is incremented by one. Step S97 is executed after step S96.

It shall be noted that step S72 (FIG. 9) may also be simplified by first calculating the quantity Rj=R mod Qj, given that the number R has a size lower than half the candidate prime number Pr. Each number Wj in the table W is then equal to (Gj·Rj+1) mod Qj, the numbers Rj and Gj being lower than the prime number Qj which may have a size limited to 8 or 16 bits.

Figure 12:
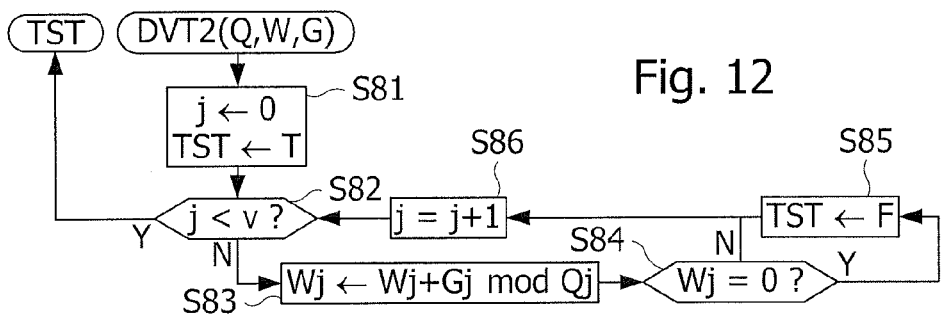

FIG. 12 represents steps S81 to S86 of the procedure DVT2, according to one embodiment. In step S81, a loop index j is set to 0 and a Boolean variable TST is set to "True". Step S82 which forms the input point of a loop comprising steps S83 to S86, compares the index j to the number v of prime numbers in the list Q. This loop enables the divisibility of the number Pr by each number Qj of the list Q, to be tested, when the number Pr has been incremented by 2P in step S41 of the procedure GNSP2. This loop also enables the table of values W to be updated, given the modification of the number Pr in step S41.

If the index j is lower than the number v in step S82, a loop iteration beginning at step S83 is executed, otherwise, the procedure DVT2 ends by supplying the variable TST. In step S83, the table W at index j is updated using the following formula:

$$Wj=Wj+Gj \bmod Qj \quad (12)$$

which corresponds to the formula (9) given the update of the number Pr performed in step S41. The implementation of the formula (12) is also a calculation simplification compared with the formula (9) executed in step S83. Indeed, the formula (12) only comprises an addition of small numbers, possibly followed by a subtraction by Qj, while the formula (9) involves dividing a large number (Pr) by a small number (Qj).

In step S84, the value Wj is compared with 0. If the value Wj is equal to 0, meaning the candidate number Pr is divisible by the number Qj, steps S85 and S86 are executed, otherwise only step S86 is executed. In step S85, the variable TST is set to "False", to indicate that the number Pr is not a prime number. In step S86, the index j is incremented by one. Step S82 is executed after step S86.

It shall be noted that choosing the number v of the smallest prime numbers used in steps S73, S78, S79 and S83 may also be performed as a function of the global execution duration of the procedure GNLP calling the procedure GNSP3, given that the more the value v is increased, the more the execution duration of the procedures DVT1, DVT2 increases, and the more the global execution duration of the tests performed in step S36 decreases. The number v may be chosen at a value between 100 and 200. It shall be noted that the number v chosen for the procedure GNSP3 may be applied to the procedure INTP or INTP1 executed in step S5.

Figure 13:
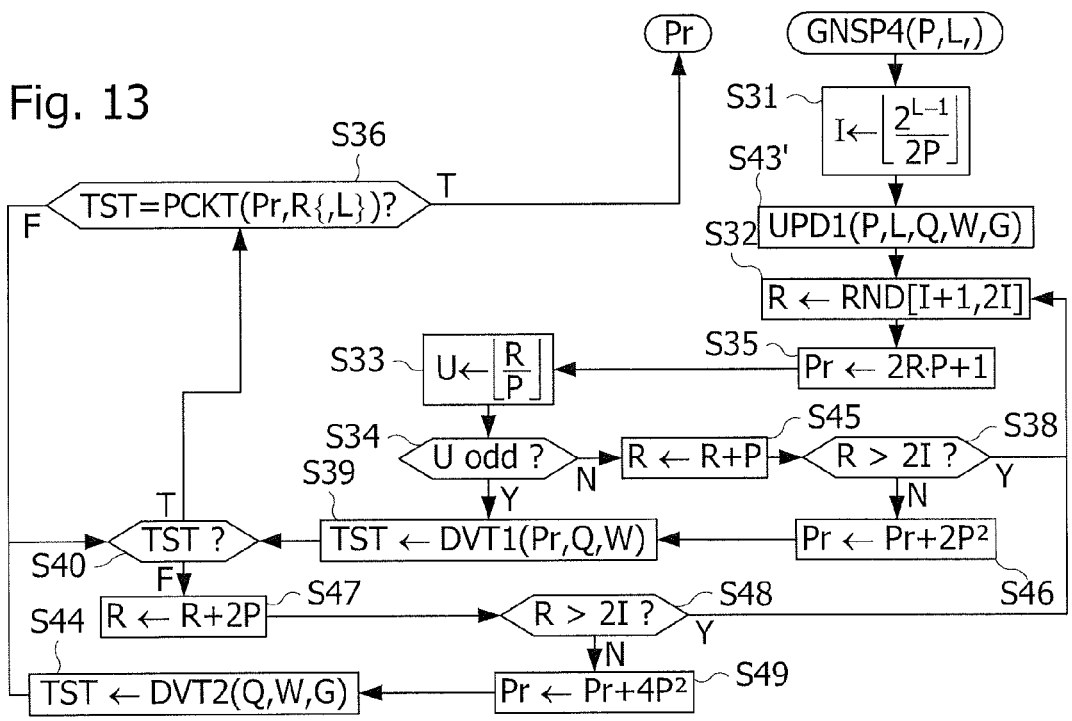
FIG. 13 represents a sequence of steps configured to generate a prime number from a prime number of lower size, according to another embodiment.

FIG. 13 represents another embodiment GNSP4 of the procedure GNSP of FIG. 3. The procedure GNSP4 enables the quotient U to be calculated once only, the integer R being modified so that the quotient U remains odd. The procedure GNSP4 differs from the procedure GNSP1 of FIG. 7 in that it comprises additional steps S39, S40, S43' and S44 to S49, step S37 being removed. Step S43' is executed between steps S31 and 32. Steps S39 and S40 are successively executed after step S34 if the number U is odd. Steps S45 and S38 are successively executed after step S34 if the number U is even. In step S43', a procedure UPD1 for initializing the table G is called. This procedure receives as parameters the prime number P, the size L of the current candidate prime number Pr, and the tables of values W and G. In step S39, the procedure DVT1 is called, this procedure returning a Boolean variable TST. In step S45 (if the number U is even), the number R is incremented by P, which corresponds to an incrementation of the quotient U by one, which thus becomes odd. In step S38, the number R is compared with the quantity 2I, so that R remains within the interval [I+1, 2I]. If the number R is greater than the quantity 2I, the execution of the procedure continues at step S32 to randomly choose a new number R in the interval [I+1, 2I], to calculate a new candidate prime number Pr (step S35) and to test it. If in step S38, the number R is lower than or equal to the quantity 2I, steps S46 and S39 are successively executed. In step S46, the candidate prime number Pr is incremented by twice the squared prime number P (2P²), which corresponds to the incrementation of R in step S45, given equation (1).

In step S40, the variable TST is tested. If the variable TST is on "True", the procedure PCKT (or PCKT1) is called by returning the variable TST (step S36). If the procedure PCKT called in step S36 returns "False", step S40 is executed, and otherwise, the number Pr is certainly prime and the procedure GNSP4 ends by supplying the number Pr. If in step S40, the variable TST is on "False", steps S47 and S48 are executed. In step S48, the number R is incremented by twice the prime number P, which corresponds to an incrementation of the quotient U by two, so that U remains odd. In step S48, the number R is compared with the quantity 2I, so that R remains within the interval [I+1, 2I]. If the number R is greater than the quantity 2I, the execution of the procedure continues at step S32. Otherwise, steps S49, S44 and S40 are executed. In step S49, the candidate prime number Pr is incremented by four times the squared prime number P, which corresponds to the incrementation of the number R in step S47. In step S44, the procedure DVT2 is called to test the divisibility of the number Pr by the prime numbers of the list Q using the tables of values W and G.

In this way, the operations performed in steps S35 and S33, involving large numbers, are performed only during the activation of the procedure GNSP4 and when the number R is no longer in the interval [I+1, 2I]. When the candidate prime number Pr is detected not prime in steps S36, S39 and S44, the number R is incremented by P or 2P to maintain the quotient U odd and the divisibility tests performed by the procedures DVT1 and DVT2 are performed avoiding as much as possible the operations involving large numbers like Pr and P.

Figure 14:
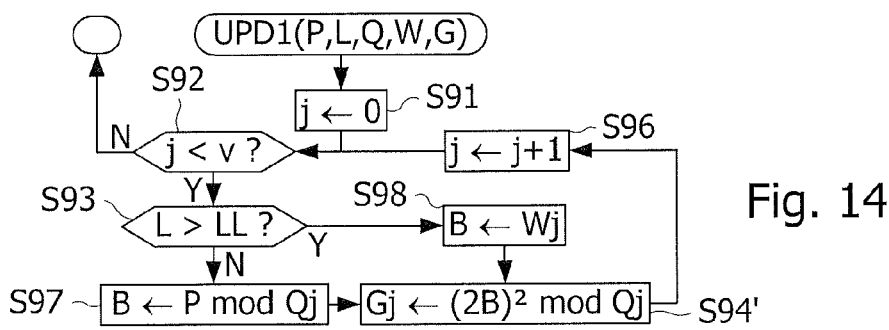
FIG. 14 represents a sequence of initialization steps called by the sequence of FIG. 13.

FIG. 14 represents the procedure UPD1, according to one embodiment. The procedure UPD1 differs from the procedure UPDG in that it comprises additional steps S97 and S98 and in that step S94 is replaced with a step S94', step S95 being removed. If, in step S93, the size L corresponds to that of the first prime number supplied by the procedure INTP, steps S97, S94' and S96 are executed, otherwise steps S98, S94' and S96 are executed. In step S97, a variable B receives the remainder of the division of the number P by the integer Qj of rank j of the list Q. In step S98, the variable B receives the number Wj indicated at index j in the table of values W previously obtained during a previous call of the procedure DVT1 or DVT2. In step S94', the value Gj at index j in the table G is calculated using the following formula:

$$Gj=(2B)^2 \bmod Qj \quad (13)$$

Qj being a prime number of rank j in the list Q.

The implementation of the formula (13) is also a calculation simplification compared with the formula (10) executed in step S94. Indeed, the formula (13) involves dividing small numbers.

Figure 15:
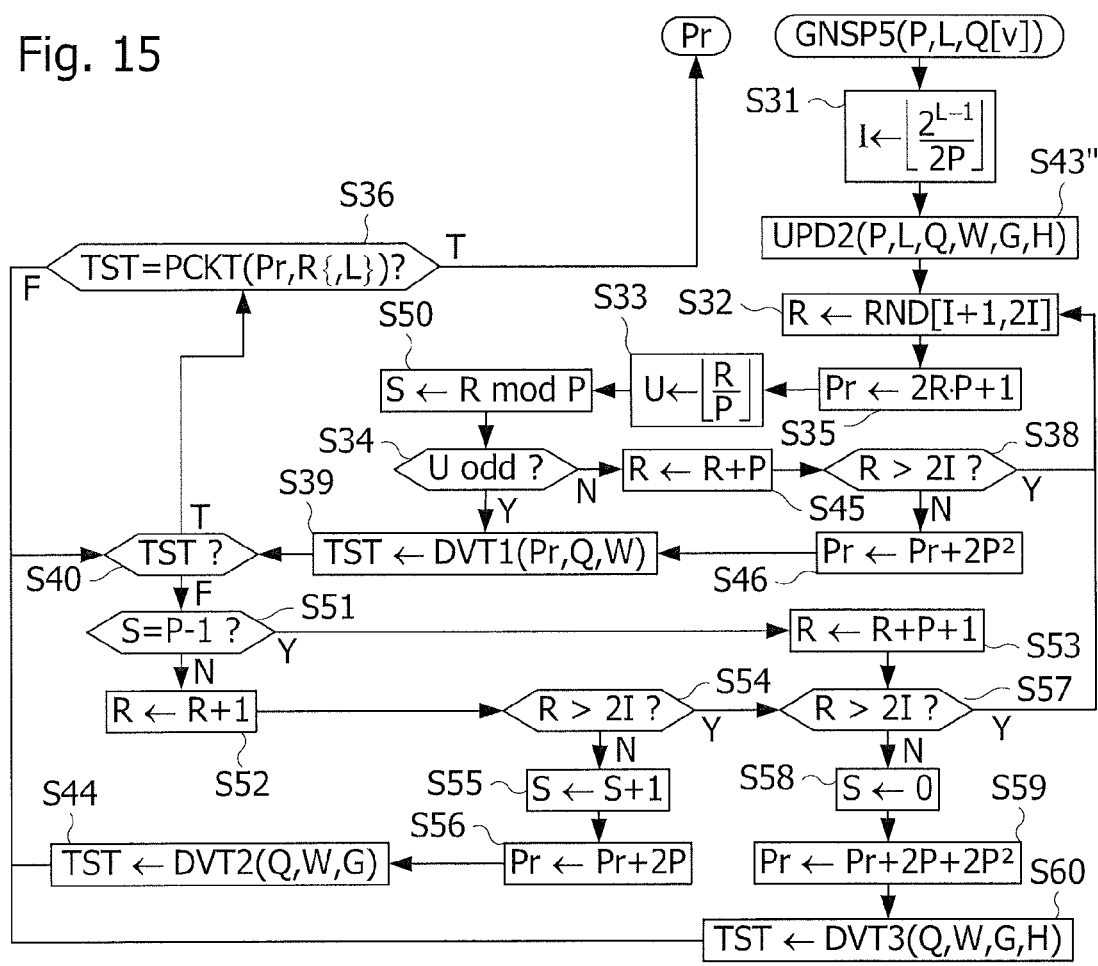
FIG. 15 represents a sequence of steps configured to generate a prime number from a prime number of lower size, according to another embodiment.

FIG. 15 represents another embodiment GNSP5 of the procedure GNSP of FIG. 3. The procedure GNSP5 differs from the procedure GNSP4 of FIG. 13 in that it comprises additional steps S50 to S60, steps S47 to S49 being removed, and step S43' being replaced with a step S43". In step S50, which is executed between steps S33 and S34, a variable S receives the remainder of the integer division of the number R by the prime number P. In step S43", an update procedure UPD2 is called to update the table G, as well as an additional table H. This procedure receives as parameters the prime number P, the size L of the current candidate prime number Pr, and the tables of values W, G and H.

In step S51 which is executed after step S40 if the variable TST is on "False", the remainder S is compared with the number P. If the remainder S is equal to the number P decremented by one, steps S53 and S57 are executed. If the remainder S is lower than the number P decremented by one, steps S52 and S54 are executed. In step S52, the number R is incremented by one. In step S53, the number R is incremented by the integer P and one. In steps S54 and S57, the number R is compared with the quantity 2I. If in steps S54 and S57, the number R is greater than the quantity 2I, the execution of the procedure GNSP5 continues at step S32. If in step S54, the number R is lower than the quantity 2I, the steps S55, S56, S44 and S40 are executed. In step S55, the remainder S is incremented by one, which corresponds to the incrementation of the number R in step S54. In step S57, the candidate prime number Pr is incremented by twice the number P, which corresponds to the incrementation of the number R in step S52, given the equation (1). In step S43, the procedure DVT2 is called.

If in step S57, the number R is lower than the quantity 2I, steps S58 to S60, and then S40 are executed. In step S58, the remainder S is set to 0. In step S59, the candidate prime number Pr is incremented by twice the number P and twice this number squared, which corresponds to the incrementation of the number R in step S55, given the equation (1). In step S60, a procedure DVT3 is called with as parameters the tables Q, W, G and H. The procedure DVT3 returns a Boolean value which is loaded into the variable TST and whose value indicates whether the candidate prime number Pr is divisible or not by one of the prime numbers of the list Q.

Figure 16:
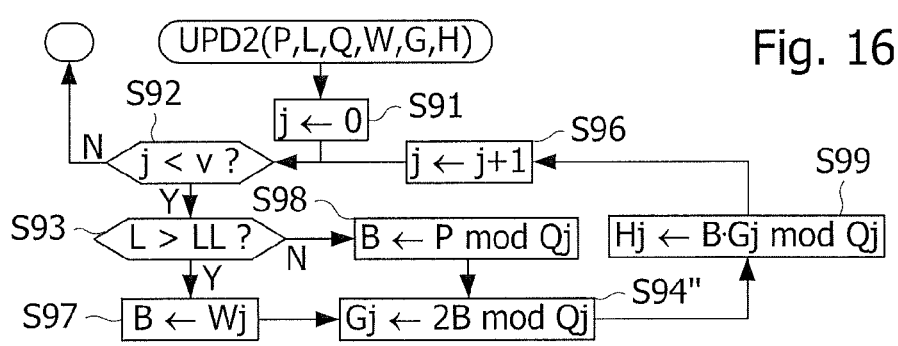
FIG. 16 represents a sequence of initialization steps called by the sequence of FIG. 15.

FIG. 16 represents the procedure UPD2, according to one embodiment. The procedure UPD2 differs from the procedure UPD1 in that it additionally receives the table H as input parameter, and in that step S94' is replaced with a step S94" and in that it comprises an additional step S99. In step S94", the value Gj of index j in the table G receives twice the value B modulo the prime number Qj of index j in the list Q. In step S99 which is executed between steps S94" and S96, the value Hj of index j in the table H receives the value B multiplied by the value Gj modulo the number Qj.

Figure 17:
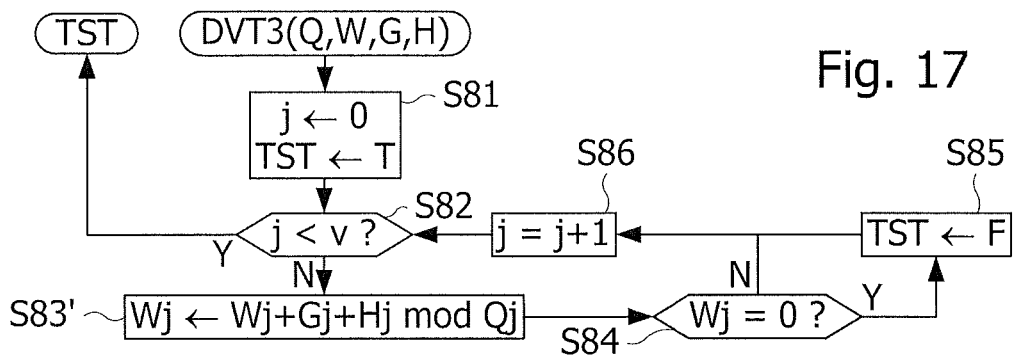
FIG. 17 represents a sequence of steps called by the sequence of FIG. 15 and configured to test the divisibility of a number by a list of prime numbers.

FIG. 17 represents steps of the procedure DVT3, according to one embodiment. The procedure DVT3 differs from the procedure DVT2 in that step S83 is replaced with step S83'. In step S83', the value at index j in the table W is updated using the following formula:

$$Wj=(Wj+Gj+Hj) \bmod Qj \quad (14)$$

which corresponds to the update of the candidate prime number Pr performed in step S60. The implementation of the formula (14) is also a calculation simplification compared with the formula (9) executed in step S72 (FIG. 9). Indeed, the formula (14) only comprises two additions of small numbers, possibly followed by a subtraction of the number Qj, while the formula (9) involves dividing the large number Pr by the number Qj.

Figure 18:
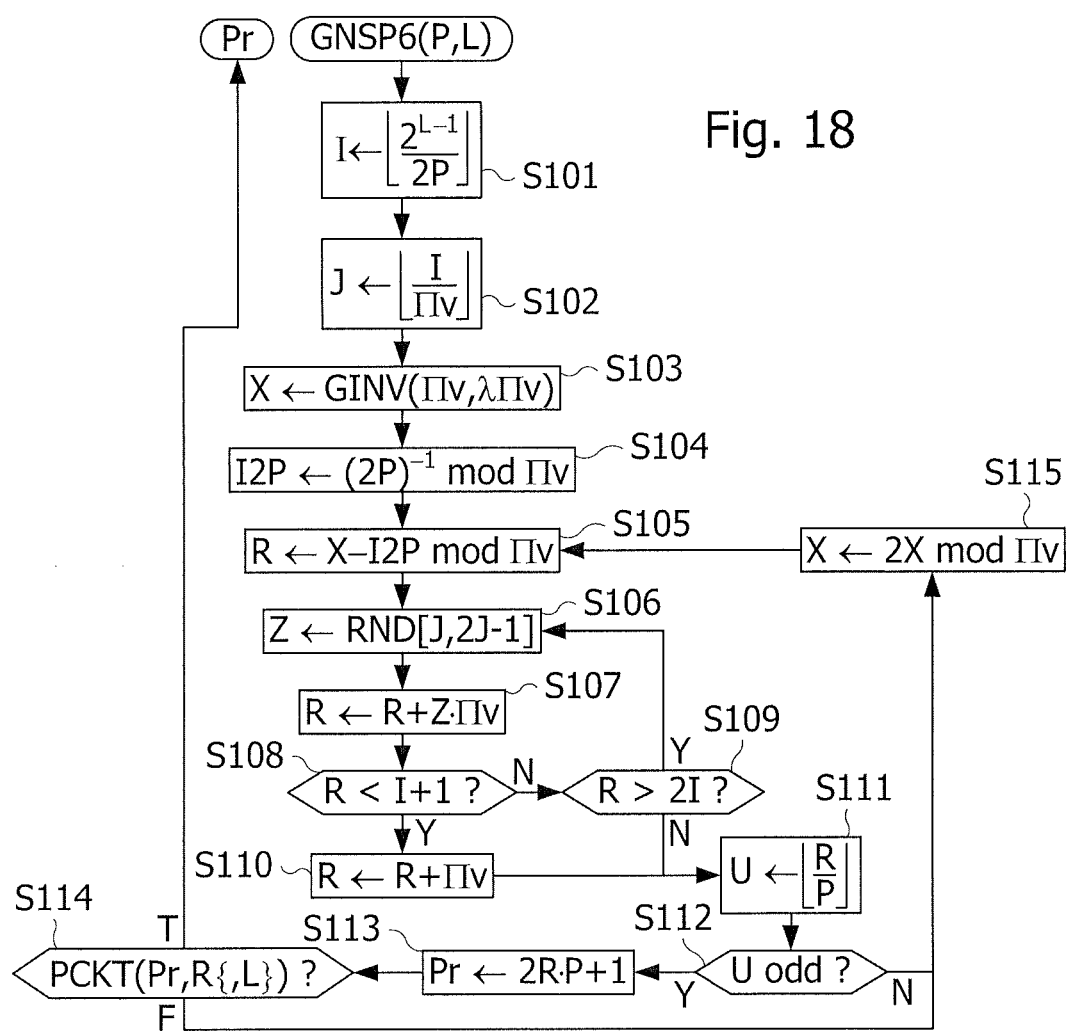
FIG. 18 represents a sequence of steps configured to generate a prime number from a prime number of lower size, according to another embodiment.

FIG. 18 represents steps S101 to S115 of a procedure GNSP6 which may be called in step S9 (FIG. 1), according to one embodiment. Steps S101 to S108 enable a number R to be generated such that the candidate prime Pr obtained by the formula (1) is not divisible by the small prime numbers of the list Q, instead of choosing a number R to calculate a candidate prime number Pr using the formula (1), and enable the divisibility of the number Pr by the prime numbers of the list Q to be tested. For this purpose, the following proposition constitutes a basis:

For any number c belonging to the set Z/nZ, Z being the set of integers and Z/nZ being the set of residues modulo n, the equation $x^{\lambda n}=1 \bmod n$ is verified if and only if x belongs to $(Z/nZ)^*$, i.e. if GCD(x, n)=1, λn being the Carmichael number, i.e. the smallest integer different from zero such that for any number x belonging to $(Z/nZ)^*$, $x^{\lambda n}=1 \bmod n$.

By choosing as value of n, the product Πv of the v first prime numbers greater than 2 (2 not included), it is possible to directly generate (by a linear sequence of steps, in contrast with an iterative sequence) a number which is prime with all the divisors of the product Πv, i.e. all the prime numbers forming the product Πv. The previous proposition simply requires a raise to the power and therefore storing this number as well as the product Πv. To implement this proposition, an invertible element of the set $(Z/\Pi vZ)^*$ must be generated, i.e. a number X such that:

$$X^{\lambda \cdot \Pi v}=1 \bmod \Pi v. \quad (15)$$

With a view to applying the formula (1), the quantity $2P(X+Z \cdot \Pi v)$ does not have any common divisor with the product Πv either, Z being an integer. It is thus sufficient to choose the quantity $2P(X+Z \cdot \Pi v)$ as candidate prime number Pr. The result is that the integer R in the formula (1) is chosen equal to:

$$R=X-((2P)^{-1} \bmod \Pi v)+Z \cdot \Pi v \quad (16)$$

the number Z being chosen so that the number R has a size such that the candidate prime number Pr has the size L calculated in step S8.

Steps S101 to S108 of the procedure GNSP are successively executed. In step S101, a number I is calculated using the following formula:

$$I = \left\lfloor \frac{2^{L-1}}{2P} \right\rfloor \quad (17)$$

P being a prime number, L being the size of a new prime number to be generated, P and L being received as input parameters of the procedure GNSP, and $$\left\lfloor \frac{x}{y} \right\rfloor$$

represents the quotient of the integer division of x by y. In step S82, a number I is calculated using the following formula:

$$J = \left\lfloor \frac{I}{\Pi v} \right\rfloor \quad (18)$$

In step S103, an invertible number X of the set $(Z/\Pi vZ)^*$ is generated. For this purpose, a procedure GINV is called with as input parameters the product Πv and the number λΠv. The procedure GINV supplies an invertible number X.

Steps S104 to S110 enable the number R to be calculated. In step S104, a number I2P is calculated which is equal to the inverse number modulo the product Πv, of twice the prime number P, i.e. $((2P)^{-1} \bmod \Pi v)$. In step S105, a number R is calculated which is equal to the number X minus the inverse number I2P modulo the product Πv. In step S106, a number Z is chosen in the interval [J, 2J−1] by means of a random or pseudo-random function RND. In step S107, the number R is incremented by the quantity Z·Πv. In steps S108 to S110, it is checked that the number R obtained in step S107 is within the interval [I+1,2I]. Thus, in steps S108 and S109, the number R is compared with the numbers I+1 and 2I. If the number R is lower than I+1, steps S110 and S111 are executed. If the number R is greater than 2I, steps S106 to S108 are executed again. If the number R is between I+1 and 2I, only step S111 is executed. In step S110, the number R is incremented by the quantity ΠN.

The next steps S111 and S112 implement the test (ii) of the previously mentioned theorem, given that the test (i) is implemented by step S114. In step S111, the quotient U of the integer division of the number R by the number P is calculated. In step S112, if the quotient U is even, step S115 is executed to generate a new value of X. The procedure GNSP6 then continues at step S105 to generate a new value of R, otherwise step S113 is executed.

In step S113, a candidate prime number Pr is calculated by the formula (1). In step S114, the procedure for applying the Pocklington test PCKT (or PCKT1) is called. This procedure receives the number Pr to be tested and the number R used to calculate the number Pr in step S113, as well as optionally the size L in number of bits of the number Pr. If the procedure PCKT returns "True", the number Pr is prime, and the procedure GNSP6 ends by supplying the number Pr. If the procedure PCKT returns "False", step S115 is executed and the execution of the procedure continues at step S105. In step S115, the number X is multiplied by a number modulo the product Πv, this number not being divisible by one of the numbers Qj forming the product Πv, for example equal to 2.

Figure 19:
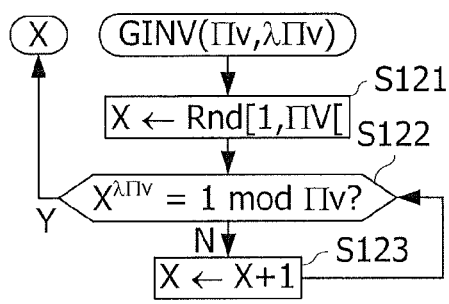
FIGS. 19 and 20 represent sequences of steps for generating an invertible number, called by the sequence of FIG. 13, according to some embodiments.

A method for generating invertible numbers is described in the document [7]. FIG. 19 represents steps S121 to S123 of the procedure for generating an invertible number GINV, according to one embodiment. The procedure GINV enables an invertible element of the set (Z/ΠvZ)* to be generated by an iterative method. In step S121, a number having a size I lower than the product Πv is chosen by means of a random or pseudo-random function. In step S122, it is tested whether the number X chosen in step S121 verifies the equation (15), i.e. whether the number X is invertible in the set (Z/ΠvZ)*. If the number X verifies the equation (15), the procedure GINV ends by supplying the number X, otherwise step S123 is executed. In step S123, the number X is incremented by 1. Steps S122 and S123 therefore form a process loop which is executed until the condition of step S122 is satisfied.

Figure 20:
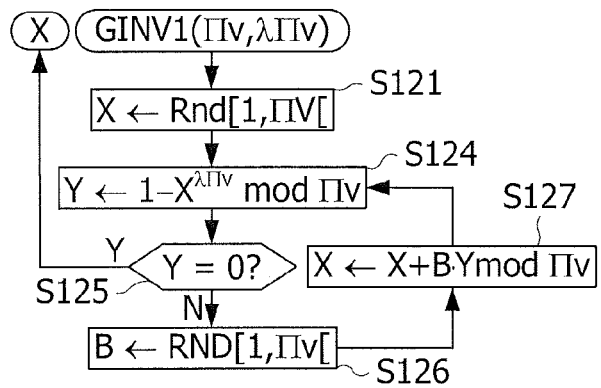

FIG. 20 represents another embodiment GINV1 of the procedure GINV. The procedure GINV1 differs from the procedure GINV in that steps S122 and S123 are replaced with steps S124 to S127. In step S124, a number Y is calculated using the following equation:

$$Y=1-X^{\lambda \cdot \Pi v} \bmod \Pi v. \tag{19}$$

In step S125, the number Y is compared with 0, and if it is equal to zero, the number X verifies the equation (15). The procedure GINV1 then ends by supplying the number X. Otherwise, steps S126, S127 are executed and the execution of the procedure GINV1 continues at step S124. In step S126, a number B lower than the product Πy is randomly chosen in step S126. In step S127, the number X is incremented by the product of the numbers B and Y. The execution of the procedure GINV1 then continues at step S14 to test whether the number X verifies the equation (15).

FIG. 21 represents another embodiment GNSP7 of the procedure GNSP6. The procedure GNSP7 is configured to generate an integer R which is not divisible by the factors of the product Πv, but which also verifies the condition that the quotient U of the integer division of the number R by the prime number P is odd. For this purpose, the basis is the property according to which the number R and the remainder S of the integer division of the number R by the number P are of opposite parities if and only if the quotient U of the integer division of R by P is odd. The procedure GNSP7 therefore randomly chooses the remainder S odd and obviously lower than the number P. It is then merely necessary to check that the obtained integer R is even so that the quotient U is odd. For that, the number R is generated using the Chinese remainder theorem. A number R must be found, which simultaneously verifies the following equations:

$$R=X-1/(2P) \bmod \Pi v \tag{20}$$

$$R=S \bmod P \tag{21}$$

$$R=0 \bmod 2 \tag{22}$$

This problem can be solved by the Garner algorithm or the Gauss algorithm. By the Garner algorithm, by calculating a number K and the number R using the following formulas:

$$K=(((X-(2P)^{-1}-S)/P) \bmod \Pi v) \cdot P+S, \tag{23}$$

$$R=K+(K \bmod 2) \cdot P \cdot \Pi v. \tag{24}$$

The procedure GNSP7 differs from the procedure GNSP6 in that steps S111 and S112 have been removed and replaced with steps S116 to S119, and steps S102, S107 and S110 are replaced with steps S102', S107' and S110'. Step S113 for calculating a new candidate prime number Pr is executed immediately after step S109 or S110. In step S102', the number J is calculated by taking the integer part of the division of the number I by twice the prime number P and by the product Πv. Steps S116 to S119 are successively executed between steps S104 and S106. In step S116, an integer S lower than the number P and odd is chosen by means of a random or pseudo-random function RND. In steps S117 and S118, an integer K is calculated by the formula (23). In step S119, the integer R is calculated by the formula (24).

In step S107', the quantity 2P·Z·Πv is added to the number R so that the latter is within the interval [I+1,2I] without changing its parity. In step S108, if the number R is not greater than or equal to I+1, the quantity 2P·Πv is added to the number R in step S110'. The execution of the procedure GNSP7 continues at step S117 after step S115.

According to one embodiment, different procedures for generating a prime number may be called in step S9 of the procedure GNLP, as a function of the iteration. Thus, one of the procedures GNSP, GNSP1 to GNSP5 may be called during the first iterations of the procedure GNLP, and one of the procedures GNSP6 and GNSP7 is called during the last iterations.

FIG. 22 represents an example of electronic device DV in which the various embodiments of the previously described prime number generation method may be implemented. The device DV may be an integrated circuit on semiconductor chip, generally forming a microprocessor. The chip may for example be arranged on a medium such as a plastic card, the assembly forming a smart card.

The device DV comprises a processing unit UC, an encryption calculation block CRU, and one or more memories MEM which may comprise a volatile memory and a non-volatile memory. The electronic device DV also comprises a communication interface 101 of the contact or contactless type, for example a circuit RF or UHF operating by inductive coupling or by electrical coupling. The block CRU may be a coprocessor equipped with a programmable central control unit of the state machine type, a full hardware coprocessor, or sub-programs executed by the unit UC.

According to one embodiment, the calculation block CRU may be configured to perform upon request from the unit UC multiplications of large numbers, for example having a size between 32 and 2,048 bits, and in particular the one performed in steps S35 and S114 of the procedures GNSP, GNSP1 to GNSP6, as well as those involved in the modular exponentiation calculations of the Fermat and Miller-Rabin tests executed in the procedures INTP, INTP1, and of the Pocklington test executed in the procedures PCKT and PCKT1.

According to another embodiment, the calculation block may also be configured to directly perform upon request from the processing unit UC, the modular exponentiation operations of the Fermat and Miller-Rabin tests executed in the procedures INTP, INTP1, and of the Pocklington test executed in the procedures PCKT and PCKT1.

The device DV may also comprise a random or pseudo-random generator RGN of M-bit binary words to perform steps S21, S32, S52, S103 and S121.

The unit UC may thus comprise a prime number generation module PGN implementing the procedure GNLP calling one and/or the other of the procedures GNSP, GNSP1 to GNSP6. The unit UC may also comprise a module KGN for generating encryption data such as encryption keys, and signature SGN and ciphering ENC modules using encryption data generated by the module KGN. Each module PGN, KGN, ENC, SGN may use the block CRU to perform complex operations, such as multiplications of large numbers or modular exponentiations. The generated encryption data is stored in the memory MEM.

The modules KGN, SGN and ENC may for example implement the RSA algorithm by generating two prime numbers of 512 or 1,024 bits by means of the module PGN. FIG. 23 shows a procedure KGEN1 for generating a pair of secret and public keys, complying with the RSA algorithm, executed by the module KGN. The procedure KGEN1 comprises steps S141 to S146. In steps S141 and S142, two prime numbers P and Q are generated by means of a procedure PRGN receiving as input parameter the size L of the prime numbers to be generated. The procedure PRGN corresponds to one of the procedures GNLP, GNLP1, GNM, GNST executed by the module PGN. In step S143, the numbers P and Q are multiplied one by the other to obtain a number N. In step S144, an odd number E is randomly chosen in a certain interval, for example between $2^{16}$ and $2^{256}$. In step S145, if the number E chosen is divisible by the quantity (P−1)(Q−1), a new number E is chosen in step S144, otherwise step S146 is executed to choose a number D such that E×D is equal to 1 modulo (P−1)(Q−1). The procedure KGEN1 ends after step S146 by supplying as private key the pair of numbers (N,D) and as public key the pair of numbers (N,E).

The DSA algorithm may also be implemented by the modules KGN, SGN and ENC, by generating two prime numbers of different sizes, for example 256 and 2,048 bits. FIG. 24 represents a procedure KGEN2 for generating a pair of secret and public keys, complying with the DSA algorithm, executed by the module KGN. The procedure KGEN2 comprises steps S151 to S155. In steps S151 and S152, two prime numbers P and Q are generated by means of a procedure PRGN successively receiving as input parameter the sizes L1, L2 of the prime numbers P and Q to be generated. The sizes L1 and L2 are for example equal respectively to 2,048 and 256 bits. In step S153, a procedure GGEN is called to generate a number G which constitutes a number generating the sub-group of order Q modulo P. In step S154, a secret key SK is randomly chosen in the interval [1, Q−1]. In step S155, a public key PK is calculated by raising the number G to the power SK modulo P. The procedure KGEN2 ends after step S155 by supplying the pair of private and public keys (SK, PK).

It will be clear to those skilled in the art that the present invention is susceptible of various embodiments and applications, in particular various other algorithms and devices implementing such algorithms. Thus, the invention also comprises all the possible combinations of the various embodiments described.

The invention is not limited either to an iterative method of generating a large prime number. Indeed, it may be considered to store a prime number having a size substantially equal to half or a third of the prime numbers to be generated and to execute a single iteration corresponding to the execution of one of the procedures GNSP and GNSP1 to GNSP7. Compared with the solution consisting of directly storing a prime number that can be used to generate encryption keys, this solution has a gain in terms of storage capacity equal to half or two thirds the size of the prime numbers used. This solution also has an advantage in terms of security and confidentiality, since it is not possible to know in advance the prime number(s) that will be used to generate the encryption keys. Indeed, even if the previous prime number is fixed, the random choice of the integer R enables most prime numbers having the desired size to be obtained in a single iteration.

List Of The Previously Mentioned Publications

[1] C. Pomerance, C. Selfridge, and J. L. Wagstaff. "The pseudoprimes to 25x10e9", Mathematics of Computation, 35:1003-1026, 1990.
[2] G. Jaeschke, "On strong pseudoprimes to several bases", Mathematics of Computation, 61:915-926, 1993.
[3] U. M. Maurer, "Fast generation of prime numbers and secure public-key cryptographic parameters", J. Cryptology, 8(3):123-155, 1995.
[4] J. Shawe-Taylor, "Generating strong primes", Electronic Letters, 22(16):875-877, 1986.
[5] FIPS PUB 186-3, "Digital Signature Standard", National Institute of Standards and Technology, October 2009.
[6] J. Brillhart, D. H. Lehmer, J. L. Selfridge, B. Tuckerman, and Jr. S. S. Wagstaff, "Factorization of b"±1, b=2; 3; 5; 7; 10; 11; 12 Up to High Powers", vol. 22, American Mathematical Society, 1988.
[7] M. Joye, P. Paillier, S. Vaudenay, "Generation of Prime Numbers", CHES 2000, p. 340-354

The invention claimed is:

1. A cryptographic method implemented in an electronic device, the method comprising operations of:
   (a) generating a candidate prime number from another prime number in accordance with:

$Pr = 2P \cdot R + 1,$ where Pr is the candidate prime number, P is a prime number having a number of bits lower than a desired number of bits of the candidate prime number, and R is an integer, wherein a size in number of bits of the candidate prime number is equal to a margin of one bit to three times a size of the prime number;

(b) calculating a quotient of an integer division of the integer by the prime number;
(c) rejecting the generated candidate prime number in response to detecting that the quotient of the integer division of the integer by the prime number is even;
(d) applying the Pocklington primality test to the candidate prime number;
(e) storing, in a memory of the electronic device, the candidate prime number as a proven prime number in response to passing the Pocklington primality test, else generating a new candidate prime number and performing operations (b) to (e) again with the new candidate prime number;
(f) generating, from the proven prime number, a cryptographic key; and
(g) performing, by the electronic device using the cryptographic key, a cryptographic operation on data, the cryptographic operation being one of an encryption operation, a decryption operation, or a verification of a digital signature included in the data.

2. The method of claim 1, wherein, if the candidate prime number is rejected or if the candidate prime number does not pass the Pocklington primality test, the method further comprises:
incrementing the integer by one or a certain quantity as a function of parity of the quotient so that the quotient is odd;
modifying the candidate prime number by adding twice the prime number thereto; and
applying the Pocklington primality test to the modified candidate prime number.

3. The method of claim 1, further comprising testing divisibility of the generated candidate prime number by small prime numbers, the generated candidate prime number being retained as the candidate prime number only if it is not divisible by the small prime numbers.

4. The method of claim 1, wherein generating the proven prime number includes iteratively generating the proven prime number, the iteratively generating including a plurality of prime number generation operations, a first prime number generation operation of the plurality of prime number generation operations including generating a first candidate prime number from the prime number P,
each subsequent prime number generation operation of the plurality of prime number generation operations including generating another candidate prime number from the candidate prime number obtained in an immediately preceding prime number generation operation, the iteratively generating continuing until a prime number having the desired number of bits is obtained, each prime number generation operation including applying the Pocklington primality test to a respective candidate prime number.

5. The method of claim 4, further comprising, for each prime number generation operation:
storing as first remainders, remainders of integer divisions of a respective candidate prime number by each small prime number of a group of small prime numbers, the respective candidate prime number being divisible by one of the small prime numbers if a corresponding remainder is equal to zero;
storing as second remainders, remainders of integer divisions, by each of the small prime numbers, of twice the prime number P, for the first prime number generation operation, or twice the candidate prime number obtained in the immediately preceding prime number generation operation, for each of the subsequent prime number generation operations; and
if a new candidate prime number is calculated from the respective candidate prime number by adding twice the prime number P, for the first prime number generation operation, or twice the candidate prime number obtained in the immediately preceding prime number generation operation, for each of the subsequent prime number generation operations thereto, updating each of the first remainders by respectively adding thereto the second remainder corresponding to the same small prime number.

6. The method of claim 5, wherein each subsequent prime number generation operation includes:
randomly choosing a new integer; and
updating each of the second remainders with double of the first remainder corresponding to a same small prime number obtained in a previous prime number generation operation.

7. The method of claim 1, wherein the integer is randomly chosen in an interval of [I+1, 2I], wherein:

$$I = \left\lfloor \frac{2^{L-1}}{2P} \right\rfloor$$

L being a desired number of bits of a new prime number to be generated.

8. The method of claim 1, further comprising generating the integer from an invertible number belonging to a set of invertible elements modulo a product of numbers belonging to a group of small prime numbers greater than 2, so that the candidate prime number is not divisible by any number of the group, the prime number P having a number of bits equal to within one bit to a third of a desired number of bits of the candidate prime number.

9. The method of claim 8, wherein the integer is chosen as being equal to:

$R = X - ((2P)^{-1} \mod \Pi v) + Z \cdot \Pi v$,

X being an invertible number modulo the product of the numbers of the group of small prime numbers greater than 2, P being the prime number, and Z being an integer chosen so that the integer R has a size such that the candidate prime number has a desired number of bits.

10. The method of claim 8, wherein the integer is chosen so as to be even and so that a remainder of its integer division by the prime number is odd.

11. The method of claim 8, wherein the integer is chosen to be equal to:

$R = K + (K \mod 2) P \cdot \Pi v + 2P \cdot Z \cdot \Pi v$, where $K = (((X - (2P)^{-1} - S)/P) \mod \Pi v) P + S$, S being a remainder of the integer division of the integer R by the prime number P, X being an invertible number modulo the product $\Pi v$ of the prime numbers of the group, P being the prime number, and Z being an integer chosen so that the integer R has a size such that the candidate prime number has the desired number of bits.

12. The method of claim 8, wherein if the candidate prime number does not pass the Pocklington primality test, the method further comprises generating a new candidate prime number by adding to the candidate prime number a multiple of the invertible number modulo the product, the multiple not being divisible by one of the numbers forming the product, and applying the Pocklington primality test to the new candidate prime number.

13. The method of claim 8, wherein the invertible number is generated by searching for an invertible candidate number X lower than the product Πv verifying the following equation:

$$X\lambda\Pi v = 1 \bmod \Pi v,$$

λΠv being the Carmichael number of the set of invertible elements modulo the product Πv.

14. The method of claim 13, wherein an invertible candidate number is randomly chosen at a value lower than the product Πv and incremented by one or a quantity B (1−XλΠv mod Πv) until it verifies the equation:

$$X\lambda\Pi v = 1 \bmod \Pi v,$$

B being an integer randomly chosen between one and the product Πv.

15. The method of claim 14, wherein the generation of a first prime number includes:
randomly choosing a number that includes a number of bits that is less than a maximum number of bits; and
applying, to the chosen number, a limited set of Miller-Rabin tests (MRA, A=2, 7, 61; 3, 5, 7, 11, 13, 17) in different bases, until the chosen number passes the set of Miller-Rabin tests, the maximum number of bits and values of the bases being chosen to prove primality of the first prime number.

16. The method of claim 15, wherein the Miller-Rabin tests applied to the randomly chosen number are performed in bases 2, 7 and 61 with the maximum number of bits, chosen lower than or equal to 32, or in bases 2, 3, 5, 7, 11, 13 and 17, with the maximum number of bits chosen lower than or equal to 48.

17. An electronic device comprising a calculation block to execute multiplications of large numbers and/or modular exponentiation operations, wherein the electronic device is configured to:
(a) generate a candidate prime number from another prime number in accordance with:

$$Pr = 2P \cdot R + 1,$$

where Pr is the candidate prime number, P is a prime number having a number of bits lower than a desired number of bits of the candidate prime number, and R is an integer, wherein a size in number of bits of the candidate prime number is equal to a margin of one bit to three times a size of the prime number;
(b) calculate a quotient of an integer division of the integer by the prime number;
(c) reject the generated candidate prime number in response to detecting that the quotient of the integer division of the integer by the prime number is even;
(d) apply the Pocklington primality test to the candidate prime number;
(e) store, in a memory of the electronic device, the candidate prime number as a proven prime number in response to passing the Pocklington primality test, else generating a new candidate prime number and performing operations (b) to (e) again with the new candidate prime number;
(f) generate, from the proven prime number, a cryptographic key; and
(g) perform, by the electronic device using the cryptographic key, a cryptographic operation on data, the cryptographic operation being one of an encryption operation, a decryption operation, or a verification of a digital signature included in the data.

18. An integrated circuit on a semiconductor chip, the integrated circuit comprising a device according to claim 17.

19. The device of claim 17, wherein the device is further configured to, if the candidate prime number is rejected or if the candidate prime number does not pass the Pocklington primality test:
increment the integer by one or a certain quantity as a function of parity of the quotient so that the quotient is odd;
modify the candidate prime number by adding twice the prime number thereto; and
apply the Pocklington primality test to the modified candidate prime number.

20. The device of claim 17, wherein the device is further configured to test divisibility of the generated candidate prime number by small prime numbers, the generated candidate prime number being retained as the candidate prime number only if it is not divisible by the small prime numbers.

21. The device of claim 17, wherein generating the proven prime number includes iteratively generating the proven prime number, the iteratively generating including a plurality of prime number generation operations, a first prime number generation operation of the plurality of prime number generation operations including generating a first candidate prime number from the prime number P,
each subsequent prime number generation operation of the plurality of prime number generation operations including generating another candidate prime number from the candidate prime number obtained in an immediately preceding prime number generation operation, the iteratively generating continuing until a prime number having the desired number of bits is obtained, each prime number generation operation including applying the Pocklington primality test to a respective candidate prime number.

22. The device of claim 21, wherein the device is further configured to, for each prime number generation operation:
store, as first remainders, remainders of integer divisions of a respective candidate prime number by each small prime number of a group of small prime numbers, the respective candidate prime number being divisible by one of the small prime numbers if a corresponding remainder is equal to zero;
store, as second remainders, remainders of integer divisions, by each of the small prime numbers, of twice the prime number P, for the first prime number generation operation, or twice the candidate prime number obtained in the immediately preceding prime number generation operation, for each of the subsequent prime number generation operations; and
if a new candidate prime number is calculated from the respective candidate prime number by adding twice the prime number P, for the first prime number generation operation, or twice the candidate prime number obtained in the immediately preceding prime number generation operation, for each of the subsequent prime number generation operations thereto, update each of the first remainders by respectively adding thereto the second remainder corresponding to the same small prime number.

23. The device of claim 22, wherein each subsequent prime number generation operation includes:
randomly choosing a new integer; and
updating each of the second remainders with double of the first remainder corresponding to a same small prime number obtained in a previous prime number generation operation.

24. The device of claim 17, wherein the integer is randomly chosen in an interval of [I+1, 2I], wherein:

$$I = \left\lfloor \frac{2^{L-1}}{2P} \right\rfloor$$

L being a desired number of bits of a new prime number to be generated.

25. The device of claim 17, wherein the device is further configured to generate the integer from an invertible number belonging to a set of invertible elements modulo a product of numbers belonging to a group of small prime numbers greater than 2, so that the candidate prime number is not divisible by any number of the group, the prime number P having a number of bits equal to within one bit to a third of a desired number of bits of the candidate prime number.

26. The device of claim 25, wherein the integer is chosen as being equal to:

$R = X - ((2P)^{-1} \mod \Pi v) + Z \cdot \Pi v$,

X being an invertible number modulo the product of the numbers of the group of small prime numbers greater than 2, P being the prime number, and Z being an integer chosen so that the integer R has a size such that the candidate prime number has a desired number of bits.

27. The device of claim 25, wherein the integer is chosen so as to be even and so that a remainder of its integer division by the prime number is odd.

28. The device of claim 25, wherein the integer is chosen to be equal to:

$R = K + (K \mod 2) P \cdot \Pi v + 2P \cdot Z \cdot \Pi v$, where $K = (((X - (2P)^{-1} - S)/P) \mod \Pi v) P + S$, S being a remainder of the integer division of the integer R by the prime number P, X being an invertible number modulo the product flv of the prime numbers of the group, P being the prime number, and Z being an integer chosen so that the integer R has a size such that the candidate prime number has the desired number of bits.

29. The device of claim 25, wherein if the candidate prime number does not pass the Pocklington primality test, the device is further configured to generate a new candidate prime number by adding to the candidate prime number a multiple of the invertible number modulo the product, the multiple not being divisible by one of the numbers forming the product, and applying the Pocklington primality test to the new candidate prime number.

30. The device of claim 25, wherein the invertible number is generated by searching for an invertible candidate number X lower than the product Πv verifying the following equation:

XλΠv=1 mod Πv,

λΠv being the Carmichael number of the set of invertible elements modulo the product Πv.

31. The device of claim 30, wherein an invertible candidate number is randomly chosen at a value lower than the product Πv and incremented by one or a quantity B (1−XλΠv mod Πv) until it verifies the equation:

XλΠv=1 mod Πv,

B being an integer randomly chosen between one and the product Πv.

32. The device of claim 31, wherein the generation of a first prime number includes:
randomly choosing a number that includes a number of bits that is less than a maximum number of bits; and
applying, to the chosen number, a limited set of Miller-Rabin tests (MRA, A=2, 7, 61; 3, 5, 7, 11, 13, 17) in different bases, until the chosen number passes the set of Miller-Rabin tests, the maximum number of bits and values of the bases being chosen to prove primality of the first prime number.

33. The device of claim 32, wherein the Miller-Rabin tests applied to the randomly chosen number are performed in bases 2, 7 and 61 with the maximum number of bits chosen lower than or equal to 32, or in bases 2, 3, 5, 7, 11, 13 and 17, with the maximum number of bits chosen lower than or equal to 48.

* * * * *

UNITED STATES PATENT AND TRADEMARK OFFICE
CERTIFICATE OF CORRECTION

PATENT NO. : 9,577,826 B2  Page 1 of 1
APPLICATION NO. : 14/365671
DATED : February 21, 2017
INVENTOR(S) : Feix et al.

It is certified that error appears in the above-identified patent and that said Letters Patent is hereby corrected as shown below:

In the Claims

In Column 23, Line 30, Claim 16, delete "bits," and insert -- bits --, therefor.

Signed and Sealed this
Thirtieth Day of May, 2017

Michelle K. Lee
*Director of the United States Patent and Trademark Office*